(12) United States Patent
O'Mahony

(10) Patent No.: US 12,277,919 B2
(45) Date of Patent: Apr. 15, 2025

(54) APPARATUS FOR SUPPORTING A MUSICAL KEYBOARD

(71) Applicant: Owen O'Mahony, Dublin (IE)

(72) Inventor: Owen O'Mahony, Dublin (IE)

( * ) Notice: Subject to any disclaimer, the term of this patent is extended or adjusted under 35 U.S.C. 154(b) by 0 days.

(21) Appl. No.: 18/061,465

(22) Filed: Dec. 4, 2022

(65) Prior Publication Data
US 2023/0106105 A1 Apr. 6, 2023

Related U.S. Application Data

(63) Continuation-in-part of application No. PCT/EP2021/064304, filed on May 27, 2021.

(30) Foreign Application Priority Data

Jun. 4, 2020 (GB) ..................................... 2008425
Dec. 7, 2021 (GB) ..................................... 2117632

(51) Int. Cl.
*G10H 1/32* (2006.01)
*F16M 13/02* (2006.01)

(52) U.S. Cl.
CPC ............ *G10H 1/32* (2013.01); *F16M 13/022* (2013.01); *F16M 2200/021* (2013.01)

(58) Field of Classification Search
CPC ... G10H 1/32; F16M 13/022; F16M 2200/021
See application file for complete search history.

(56) References Cited

U.S. PATENT DOCUMENTS

| 4,658,560 A | 4/1987 | Beaulieu |
| 6,610,916 B1 * | 8/2003 | Torrez ................... G10D 13/28 |
| | | 84/421 |

(Continued)

FOREIGN PATENT DOCUMENTS

| BR | 102019011630-7 A2 | 9/2019 |
| CN | 203250524 U | 10/2013 |

(Continued)

OTHER PUBLICATIONS

Search Report; Intellectual Property Office; GB2008425.7; Nov. 9, 2020.

(Continued)

*Primary Examiner* — Monica E Millner
(74) *Attorney, Agent, or Firm* — Gray Ice Higdon

(57) ABSTRACT

Apparatus 2 for supporting a musical keyboard 112 between two microphone stands 100, 106 comprising a body member 4 having a first end portion 6 and a second end portion 8. A first clamping arrangement 10 is provided at the first end portion 6 and configured to releasably clamp a microphone stand 100. A second clamping arrangement 12 is provided at the second end portion 8 and configured to releasably clamp a microphone stand 106. The body member 4 is arranged with respect to the first clamping arrangement 10 and the second clamping arrangement 12 such that, when the first clamping arrangement 10 is clamped to a first microphone stand 100 and the second clamping arrangement 12 is clamped to a second microphone stand 106 which is spaced from the first microphone stand 100, the body member 4 is arranged to support a musical keyboard for use of the keyboard.

20 Claims, 42 Drawing Sheets

(56) References Cited

U.S. PATENT DOCUMENTS

| | | | | |
|---|---|---|---|---|
| 6,923,416 | B1* | 8/2005 | Hsieh | G10H 1/32 |
| | | | | 248/431 |
| 7,368,647 | B2* | 5/2008 | Hsieh | F16M 11/38 |
| | | | | 248/431 |
| 7,932,451 | B2* | 4/2011 | Workman | F16M 11/16 |
| | | | | 84/327 |
| 8,678,403 | B1* | 3/2014 | McCleave | B62B 3/02 |
| | | | | 248/129 |
| 8,723,010 | B1* | 5/2014 | Knights | G10G 5/00 |
| | | | | 84/424 |
| 9,644,785 | B2* | 5/2017 | Carpenter | F16M 11/24 |
| 10,119,651 | B2* | 11/2018 | Piovan | F16M 11/048 |
| 11,330,352 | B2* | 5/2022 | Athan | H04R 1/08 |
| 2002/0066837 | A1* | 6/2002 | Dunbar | H04R 1/083 |
| | | | | 248/125.7 |
| 2004/0074123 | A1 | 4/2004 | Pritchard | |
| 2006/0185495 | A1* | 8/2006 | Hsieh | F16M 11/046 |
| | | | | 84/327 |
| 2008/0028369 | A1 | 1/2008 | Sasaki et al. | |
| 2008/0283698 | A1* | 11/2008 | Lorenz | G10G 5/00 |
| | | | | 248/166 |
| 2009/0015241 | A1 | 1/2009 | Gross et al. | |
| 2009/0021846 | A1 | 1/2009 | Yamamoto | |
| 2009/0152412 | A1* | 6/2009 | Lorenz | G10G 5/00 |
| | | | | 248/165 |
| 2012/0138558 | A1* | 6/2012 | Marks | G10D 13/02 |
| | | | | 211/85.6 |
| 2015/0365752 | A1* | 12/2015 | Mcintosh | H04R 1/08 |
| | | | | 381/122 |

FOREIGN PATENT DOCUMENTS

| | | | | |
|---|---|---|---|---|
| CN | 206259166 | U | | 6/2017 |
| CN | 206774227 | U | | 12/2017 |
| CN | 210245045 | U | | 4/2020 |
| DE | 3915851 | A1 | | 11/1990 |
| GB | 2323007 | A | | 3/1998 |
| GB | 2474714 | A | | 4/2011 |
| GB | 2595709 | A | | 8/2021 |
| WO | WO-2021197547 | A1 * | 10/2021 | F16M 11/046 |

OTHER PUBLICATIONS

Search Report; Intellectual Property Office; GB22117632.6; Jun. 15, 2022.

Came-TV. 2020, "Came-TV Accordian Crane Jib" Jun. 13, 2022.

* cited by examiner

APPARATUS FOR SUPPORTING A MUSICAL KEYBOARD

TECHNICAL FIELD

The present invention relates to apparatus for supporting a musical keyboard between two microphone stands such that the keyboard is supported during use of the keyboard.

BACKGROUND

Venues that host live music events typically provide various stands for supporting musical instruments and devices used by performers. For example, a venue may provide stands for supporting equipment and devices commonly used by performers such as electronic musical keyboards, synthesizers, mixing desks, microphones, guitars and other instruments or accessory equipment. However, the number of stands provided for particular devices/instruments is often less than the number of stands required. In particular, venues often provide fewer stands for electronic musical keyboards than are required. Furthermore, not all types of stand or configurations of stand will be provided. As a consequence, performers must supply stands themselves or improvise accordingly. Stands, however, are typically bulky and so performers would prefer not to have to transport stands for their equipment to and from venues. Improvising also has drawbacks since it is often not possible to set up a suitable supporting arrangement.

The invention seeks to address the problem of having too few stands at a venue which are suitable for supporting instruments or accessory equipment used by performers in desired configurations, such as an electronic musical keyboard. In particular, the invention seeks to address the problem of having to transport a bulky stand for an electronic musical keyboard.

SUMMARY OF THE INVENTION

According to a first aspect of the present invention there is provided apparatus for supporting a musical keyboard between two microphone stands comprising: a body member having a first end portion and a second end portion; a first clamping arrangement at the first end portion and configured to releasably clamp a microphone stand; and a second clamping arrangement at the second end portion and configured to releasably clamp a microphone stand, wherein the body member is arranged with respect to the first clamping arrangement and the second clamping arrangement such that, when the first clamping arrangement is clamped to a first microphone stand and the second clamping arrangement is clamped to a second microphone stand which is spaced from the first microphone stand, the body member is arranged to support a musical keyboard for use of the keyboard.

The clamping arrangements are releasable and so allow for easy attachment of the apparatus to microphone stands and subsequent removal. The body member may provide a platform on which a musical keyboard may be placed during use. It will be appreciated that the apparatus would also be suitable for supporting devices similar to musical keyboards, such as a synthesizer or a mixing desk.

The first and second clamping arrangements may be configured to secure the body member to said first and second microphone stands such that the body member extends substantially horizontally. In embodiments in which the body member provides a platform or support surface, although the body member extends substantially horizontally, the supporting surface (or surfaces) may be inclined with respect to the horizontal, for example towards a user when a user is positioned in front of the keyboard supported by the body member.

The body member may be arranged such that it can be inclined with respect to a horizontal plane such that a musical keyboard supported by the body member is inclined towards or away from a user.

The apparatus may further comprise a locking arrangement configured to lock the body member at a desired angle of inclination, for example at an angle of inclination towards a user with respect to a horizontal plane.

The body member may be pivotable with respect to each of the first and second clamping arrangements about a pivot axis that extends parallel to a longitudinal direction of the body member. This enables the body member to be inclined towards a user at a desired angle of inclination.

The first and second clamping arrangements may each comprise jaws which are openable to receive an upright post of a microphone stand.

The jaws of each of the first and second clamping arrangements may be secured together at their distal ends by respective fasteners.

The body member may be extendable and has an extended configuration for supporting a musical keyboard and a contracted configuration. The apparatus can therefore be collapsed for easy transportation and/or storage.

The body member may comprise support elements which are pivotally connected to each other to form an expandable lattice arrangement, such as a cross-linked arrangement.

The body member may comprise a first set of pivotally connected support elements extending in a first plane and a second set of pivotally connected support elements extending in a second plane.

The first plane may extend horizontally when the first and second clamping arrangements are secured to said first and second microphone stands respectively to support said musical keyboard for use of said musical keyboard.

The second plane may extend obliquely or perpendicularly with respect to the first plane.

The second plane may extend vertically when the first and second clamping arrangements are secured to said first and second microphone stands respectively to support said musical keyboard for use of said musical keyboard.

The apparatus may further comprise at least one fastener for securing a musical keyboard to the apparatus.

The body member may comprise at least one support member which is movable outwardly in a lateral direction with respect to the longitudinal direction of the body member. The body member may comprise a plurality of support members which are movable outwardly in a lateral direction with respect to the longitudinal direction of the body member. This arrangement allows for relatively broad (i.e. wide) support to be provided by the body member when the support members are deployed outwardly, but allows for the apparatus to be compact for transport/storage. The support member or members may be arranged such that the support member is, or the support members are, moved outwardly by extension of the body member into the extended configuration.

The body member may comprise a travel case, such as a travel case for a musical instrument or a musical device. The travel case may be a travel case for a musical keyboard.

Each of the first and second clamping arrangements may comprise a fastener for securing the respective first and second clamping arrangements to a microphone stand. The fastener may be a quick-release fastener such as a nut and bolt arrangement having a cam device.

According to a second aspect of the invention there is provided apparatus for supporting a musical keyboard between two microphone stands comprising: a first clamping arrangement configured to releasably clamp a microphone stand and comprising a first securing mechanism configured to be releasably secured to a first end portion of a musical keyboard; and a second clamping arrangement configured to releasably clamp a microphone stand and comprising a second securing mechanism configured to be releasably secured to a second end portion of the musical keyboard, wherein the first and second clamping arrangements are configured such that, when the first securing mechanism and the second securing mechanism are secured to first and second ends of a musical keyboard, respectively, and the first clamping arrangement and the second clamping arrangement are clamped to spaced apart first and second microphone stands, respectively, the musical keyboard is supported for use of the keyboard.

Certain embodiments of the present invention provide an apparatus for supporting a musical keyboard between two microphone stands.

Certain embodiments of the present invention provide an apparatus for supporting a musical keyboard which can be transported easily.

According to a third aspect of the present invention there is provided an extendable support apparatus for supporting one or more devices comprising: an extendable body member having a contracted configuration and an extended configuration, the body member being extendable from the contracted configuration to the extended configuration along a longitudinal direction of the body member. The term 'extended configuration' may refer to a fully extended configuration, or a partially extended configuration.

Optionally, the body member comprises a plurality of support members which are spaced apart from each other when the body member is in the extended configuration, each support member having at least one fixing feature to which a device can be secured.

Optionally, each of the plurality of support members comprises a rigid elongate member.

Optionally, each rigid elongate member may be arranged to extend perpendicularly with respect to the longitudinal axis of the body member.

Optionally, each of the rigid elongate members has a fixed length.

Optionally, at least one rigid elongate member has a fixing feature comprising an aperture through a portion of one of said rigid elongate member.

Optionally, at least one rigid elongate member has a fixing feature configured to allow a device to be secured at a selected position along its length.

Optionally, the fixing feature is configured to allow a device to be secured at a position selected along a continuous length of at least a portion of the rigid elongate member.

Optionally, the fixing feature comprises a channel extending at least partly along the length of the rigid elongate member.

Optionally, the channel is configured to receive a fastener, for example a female fastener such as a nut, or a portion of a fastener, for example a portion of a male fastener such as a bolt head of a bolt having a head and threaded portion or similar, which is configured to engage with (e.g. secured to) said device, such that the fastener is slidable along the channel. A device can be engaged with the fastener in order to secure the device to the support member. The sliding arrangement allows for a device to be moved into a desired location and adjusted readily without having to completely detach the device from the support member. Optionally, the fixing feature further comprises retaining features, such as overhanging portions, that extend along at least a portion of the length of the channel and are arranged to hold the portion of the fastener received by the channel captive within the channel.

Optionally, the channel has at least one open end, through which a nut can be inserted, for example.

Optionally, the body member comprises at least three support members. For example, the body member may comprise a support member at each end of the body member and one intermediate each end, such as midway between the ends. Alternatively, all the support members may be spaced away from the ends of the body member to provide support along a mid portion of the body member. The support members may be arranged to be spaced equally from each other when the body member is in an extended configuration. There may be at least five support members.

Optionally, the support members are spaced from the ends of the body member.

Optionally, the fixing feature comprises a socket member configured to receive a spigot of a device.

Optionally, the support apparatus comprises at least one connecting element that is configured to releasably connect to a corresponding connecting element provided on a support structure.

Optionally, the connecting element comprises a spigot.

Optionally, the connecting element comprises a clamping arrangement.

Optionally, the body member is arranged to pivot with respect to the connecting element.

Optionally, the body member is pivotable with respect to the connecting element about a pivot axis that extends parallel to a longitudinal direction of the body member.

Optionally, the connecting element comprises jaws which are openable to receive an upright post of a microphone stand.

Optionally, the body member comprises a plurality of support elements which are pivotally connected to form an expandable lattice arrangement.

Optionally, the support elements are arranged in pairs of cross-linked support elements, each pair being connected at respective ends of each support element to respective ends of support elements of at least one adjacent pair of cross-linked support elements.

Optionally, each support member is pivotally connected to at least one of the end of a support element of a pair of cross-linked support elements and slidably connected to at least one end of the other of the cross-linked support elements.

Optionally, the body member has a first end portion and a second end portion, and each end portion comprises a pivotal connection between support elements.

Optionally, the body member comprises a first set of pivotally connected support elements extending in a first plane and a second set of pivotally connected support elements extending in a second plane.

Optionally, the second set of pivotally connected support elements is arranged to pivot with respect to the first set of pivotally connected support elements such that the second plane is inclined with respect to the first plane. The second plane may be inclined with respect to the first plane obliquely or perpendicularly, and may be inclined about the longitudinal direction.

Optionally, the number of support elements of the second set of pivotally connected support elements is greater than the number of support elements of the first set of pivotally connected support elements. The number of support elements of the second set of pivotally connected support elements may be at least double the number of support elements of the first set of pivotally connected support elements.

Optionally, the second set of pivotally connected support elements comprises a further connecting element that is configured to releasably connect to a corresponding connecting element provided on a support structure.

According to a fourth aspect of the invention there is provided a system for supporting at least one performance device, the system comprising: at least one device selected from a socket member configured to receive a spigot, a microphone mount, a guitar hanger, a keyboard support, a lighting mount, a platform, a multi-component fitting, a clamping arrangement, a boom, a percussion instrument, a bracket, a speaker, an extender, an adaptor, an electronic display and a table holder having a fastening feature, and extendable support apparatus for supporting one or more devices comprising an extendable body member having a contracted configuration and an extended configuration, the body member being extendable from the contracted configuration to the extended configuration along a longitudinal direction of the body member.

Optionally, the body member comprises a plurality of support members which are spaced apart from each other when the body member is in the extended configuration, each support member comprising at least one fixing feature, wherein the fastening feature of the at least one device and the fixing feature of at least one of said support members support are configured to cooperate such that the at least one device is securable to the fixing feature.

Optionally, the at least one device comprises a socket member configured to receive a spigot of a further device, the socket member being configured to releasably secure the spigot of the further device to the socket member.

Optionally, the socket member is a quick-release coupler.

Certain embodiments of the present invention provide a support apparatus that is compact when not in use, and which can be used to provide support for a wide variety of devices.

Various further features and aspects of the invention are defined in the claims.

Unless defined otherwise, all technical and scientific terms used herein have the meaning commonly understood by a person skilled in the art to which this invention belongs.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
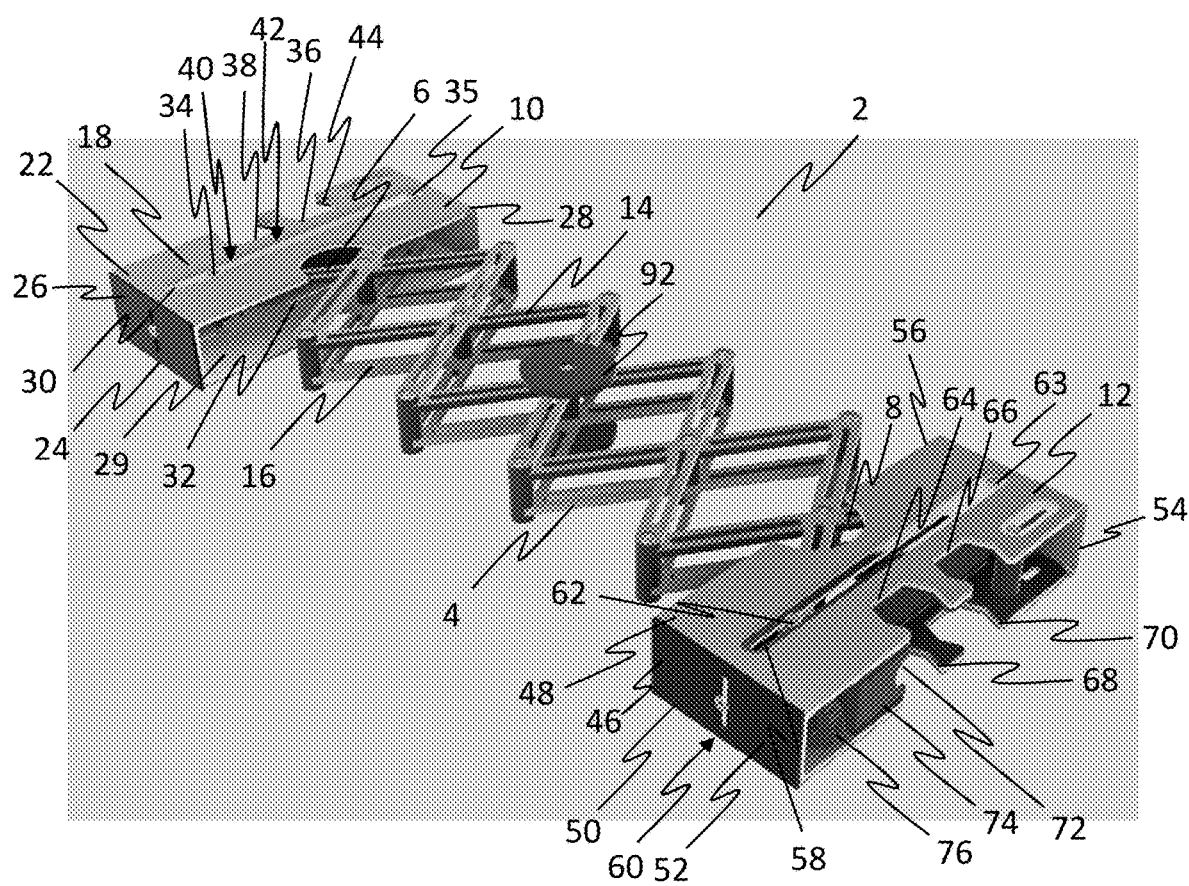
FIG. 1 shows a first embodiment of an apparatus for supporting a musical keyboard between two microphone stands.

FIG. 1 shows an apparatus 2 for supporting a musical keyboard between two microphone stands that are spaced apart from each other.

The apparatus 2 comprises a body member 4 having a first end portion 6 and a second end portion 8. A first clamping arrangement 10 is secured to the first end portion 6. A second clamping arrangement 12 is secured to the second end portion 8.

The body member 4 comprises a plurality of support elements 14, 16 which are pivotally 20 connected to each other to form an extendable arrangement. The embodiment shown comprises an upper set of support elements 14 and a lower set of support elements 16. Each of the upper and lower sets of support elements 14, 16 comprises ten rigid support elements 14, 16. The support elements 14, 16 are arranged in five pairs, the support elements 14,16 of each pair are pivotally connected to each other at their respective centres to form a cross-linked lattice arrangement. The ends of each pair of the support elements 14 of the upper set of support elements are also pivotally connected to respective ends of an adjacent pair of support elements 14 of the upper set of support elements 14, with the exception of the pairs of support elements 14 at each end of the upper set of support elements which are connected to the first clamping arrangement 10 and the second clamping arrangement 12, respectively. The lower set of support elements 16 has the same arrangement as the upper set of support elements 14. The upper and lower sets of support elements 14, 16 are also connected to each other at the pivot points to provide structural rigidity between the two sets of support elements 14, 16. The upper set of support elements 14 and the lower set of support elements 16 thus form an extendable and contractable arrangement which allows the body member 4 to be expanded and contracted in a longitudinal direction. The arrangement is comparable to the extendable arrangement associated with the device commonly referred to as 'lazy tongs'.

The first clamping arrangement 10 comprises a cassette 18 having an upper wall 22, a lower wall 24 and opposing end walls 26, 28. A first opening 29 is provided along one side of the cassette 18 through which the first end portion 6 of the body 4 extends. Upper and lower slots 30, 32 are provided in the respective upper and lower walls 22, 24 of the cassette 18 which extend parallel to the direction of expansion and contraction of the body member 4. Each slot 30, 32 receives an end of a guide pin 34 that also extends through ends of upper support element 14 and the lower support element 16 that are within the cassette 18. The guide pin 34 is slidable along the slots 30, 32 in order to allow the support elements 14, 16 to pivot with respect to each other and so allow the body member 4 to expand and contract. A static pin 35 is also connected to the cassette 18 which extends through the other upper support element 14 and the other lower support element 16 which form the pairs of support elements connected to the first clamping arrangement 10.

The first clamping arrangement 10 also has a pair of recesses 36, 38 in the form of 'cut-outs' provided in the upper wall 22. Corresponding recesses 40, 42 (not visible, but indicated generally) are provided in the lower wall 24. A clamping mechanism 44 is disposed within the cassette 10. The clamping mechanism 44 is not visible in FIG. 1, but it has the same configuration as the clamping mechanism of the second clamping arrangement of the second clamping arrangement 12 which is described in detail below.

The second clamping arrangement 12 has the same configuration as the first clamping arrangement 10 and comprises a cassette 46 having an upper wall 48, a lower wall 50 and opposing end walls 52, 54. A first opening 56 is provided along one side of the cassette 46 through which the second end portion 8 of the body 4 extends. Upper and lower slots 58, 60 (lower slot 60 indicated generally in FIG. 1) are provided in the respective upper and lower walls 48, 50 of the cassette 46. The upper and lower walls 48, 50 extend in a plane which is parallel to the direction of longitudinal expansion and contraction of the body member 4. Each slot 58, 60 extends perpendicularly with respect to the longitudinal direction of expansion and contraction of the body member 4, and receives an end of a guide pin 62 that also extends through ends of the upper support element 14 and the lower support element 16 within the cassette 46. The guide pin 62 is slidable along the slots 58, 60 in order to allow the support elements 14, 16 to pivot with respect to each other and so allow the body member 4 to expand and contract. A static pin 63 is also connected to the cassette 18 which extends through the other upper support element 14 and the other lower support element 16 which form the pairs of support elements connected to the first clamping arrangement 10.

The second clamping arrangement 12 also has a pair of recesses 64, 66 in the form of 'cut-outs' provided in the upper wall 48. Corresponding recesses 68, 70 are provided in the lower wall 50. A clamping mechanism 72 is disposed within the cassette 46.

Figure 2:
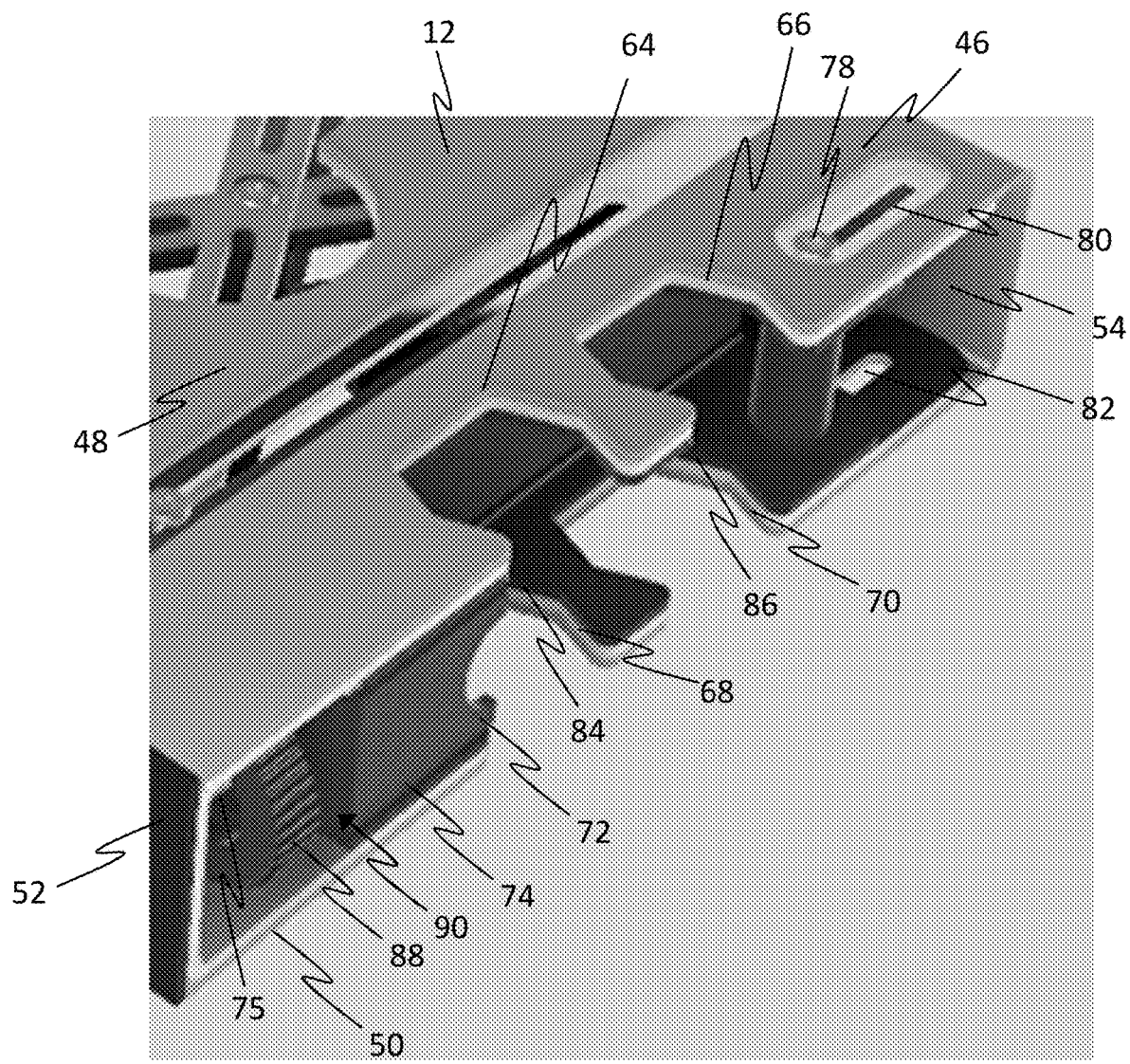
FIG. 2 shows a portion of the first embodiment shown in FIG. 1.

With particular reference to FIG. 2, the clamping mechanism 72 comprises a clamping element 74 mounted to a rod 75 that is secured to an end wall 52 of the cassette 46. The clamping element 74 is arranged to slide along the rod 75 within the cassette 46. The clamping element 74 also has a guide pin 78 at its distal end that engages with slots 80, 82 provided in the upper and lower walls 48, 50 of the cassette 46. The rod 75 and the slots 80, 82 extend in a direction which is parallel to the upper and lower walls 48, 50 and perpendicular to the end walls 52, 54 and so, in the embodiment shown, constrain the clamping element 74 to move in the direction which is perpendicular to the direction in which the body member 4 extends and contracts in the longitudinal direction of the body member 4.

The clamping element 74 has two recesses 84, 86 provided in it that correspond with (i.e. have the same size and shape as) the recesses 64, 66, 68, 70 provided in the upper and lower walls 48, 50 of the cassette 46. The clamping element 74 can be moved between a first position in which the recesses 84, 86 are aligned with the recesses 64, 66, 68, 70 provided in the upper and lower walls 48, 50 of the cassette 46 and a second position in which they are not.

The rod 75 is threaded along a portion of its length and a knob 88 having a correspond threaded bore (not visible) is threadedly engaged with the rod 75. A compression spring 90 (indicate generally) extends along the rod 75 and is disposed between the knob 88 and the clamping element 74. The spring 90 is arranged to urged the clamping element 74 away from the knob 88 so that the recesses 84, 86 in the clamping element 74 are urged out of alignment with the recesses 64, 66, 68, 70 provided in the upper and lower walls 48, 50 of the cassette 46.

Rotation of the knob 88 in one direction causes the knob 88 to move along the rod 75 towards the clamping element 74 thereby compressing the spring 90 between the knob 88 and the clamping element 74, and rotation of the knob 88 in the opposite direction causes the knob 88 to move away from the clamping element 74 thereby decompressing the spring 90. The arrangement therefore provides an adjustment mechanism for adjusting the amount of force exerted by the spring 90 against the clamping element 74 at any particular position.

Figure 3:
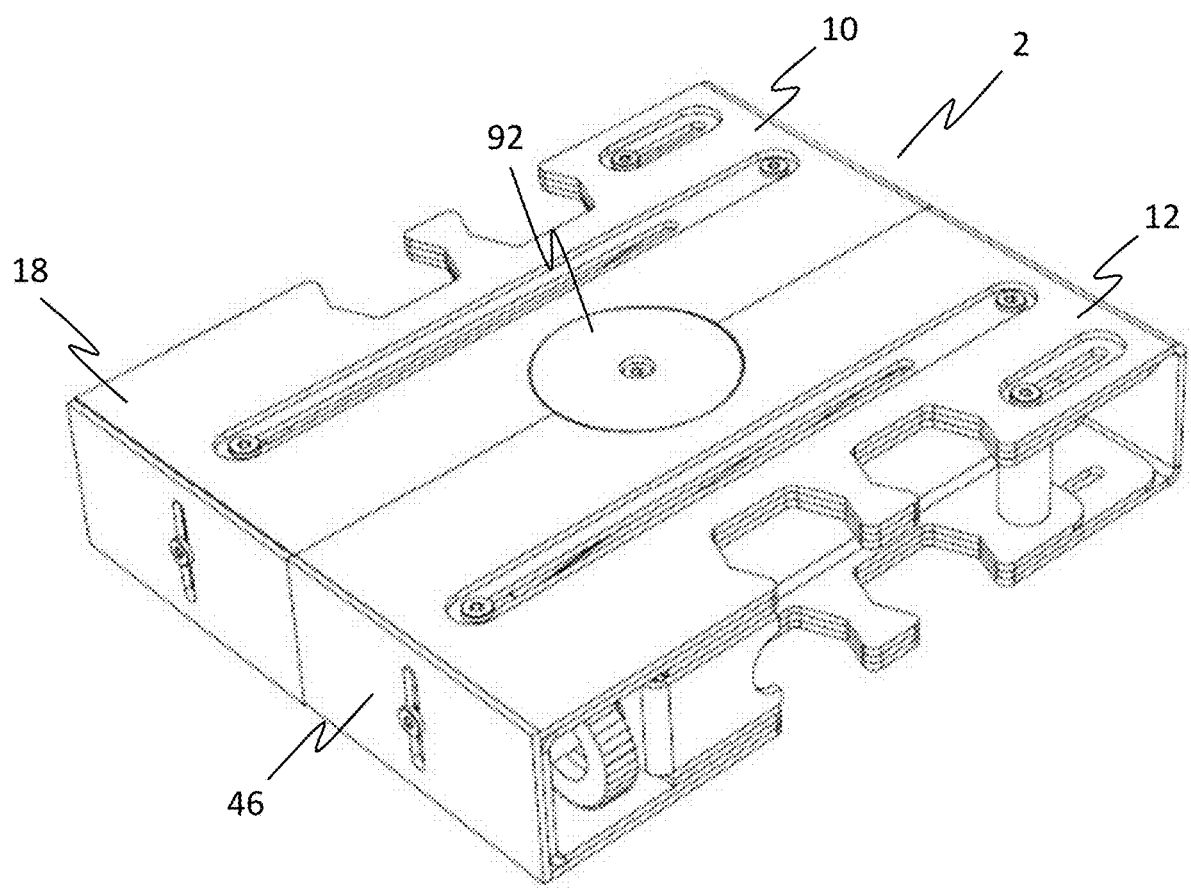
FIG. 3 shows the embodiment shown in FIG. 1 in a contracted configuration.

When not in use, the apparatus 2 may be in a contracted configuration in which the body member 4 is contracted and housed by the first and second clamping arrangements 10, 12, as shown in FIG. 3. A locking mechanism 92 is provided centrally with respect to the body member 4 for locking the first and second clamping arrangements 10, 12 together when in the contracted configuration. The contracted configuration is compact and allows for easy storage and transportation of the apparatus 2.

Figure 4:
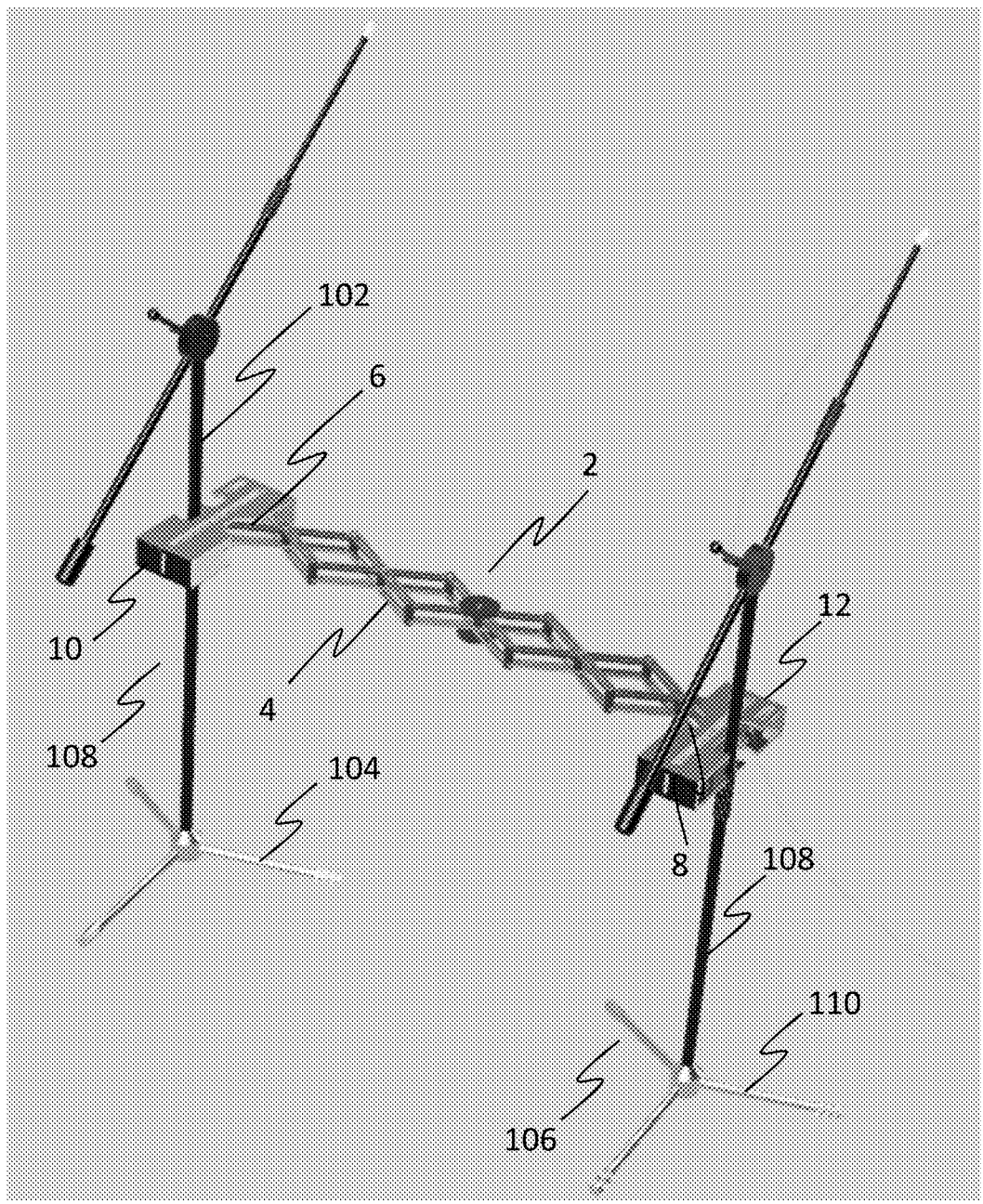
FIG. 4 shows the embodiment shown in FIG. 1 secured to first and second microphone stands.

FIG. 4 shows the apparatus 2 secured to a first microphone stand 100 comprising an upright portion 102, which in the microphone stand shown is a pole, and a base 104. The apparatus 2 is also secured to a second microphone stand 106 which comprises an upright portion 108, which in the microphone stand shown is a pole, and a base 110.

In order to secure the apparatus 2 to the first microphone stand 100 and the second microphone stand 106, the clamping element 74 of the second clamping arrangement 12 is pressed against the spring 90, for example by a user, in order to bring the recesses 84, 86 in the clamping element 74 into alignment with the recesses 64, 66, 68, 70 provided in the upper and lower walls 48, 50 of the cassette 46 respectively.

The upright portion 108 of the second microphone stand 106 is then inserted into the aligned recesses 84, 64, 68 (or alternatively aligned recesses 86, 66, 70) and the clamping element 74 is released. The spring 90 urges the clamping element 74 against the upright portion 108 thereby clamping the upright portion 108 between the edges of the recess 84 or 86 and the edges of the recesses 64, 68 or 66, 70, respectively.

The same process is repeated with the first clamping arrangement 10 and the first microphone stand 100 in order to secure the first clamping arrangement 10 to the first microphone stand 100, as shown in FIG. 4.

Figure 5:
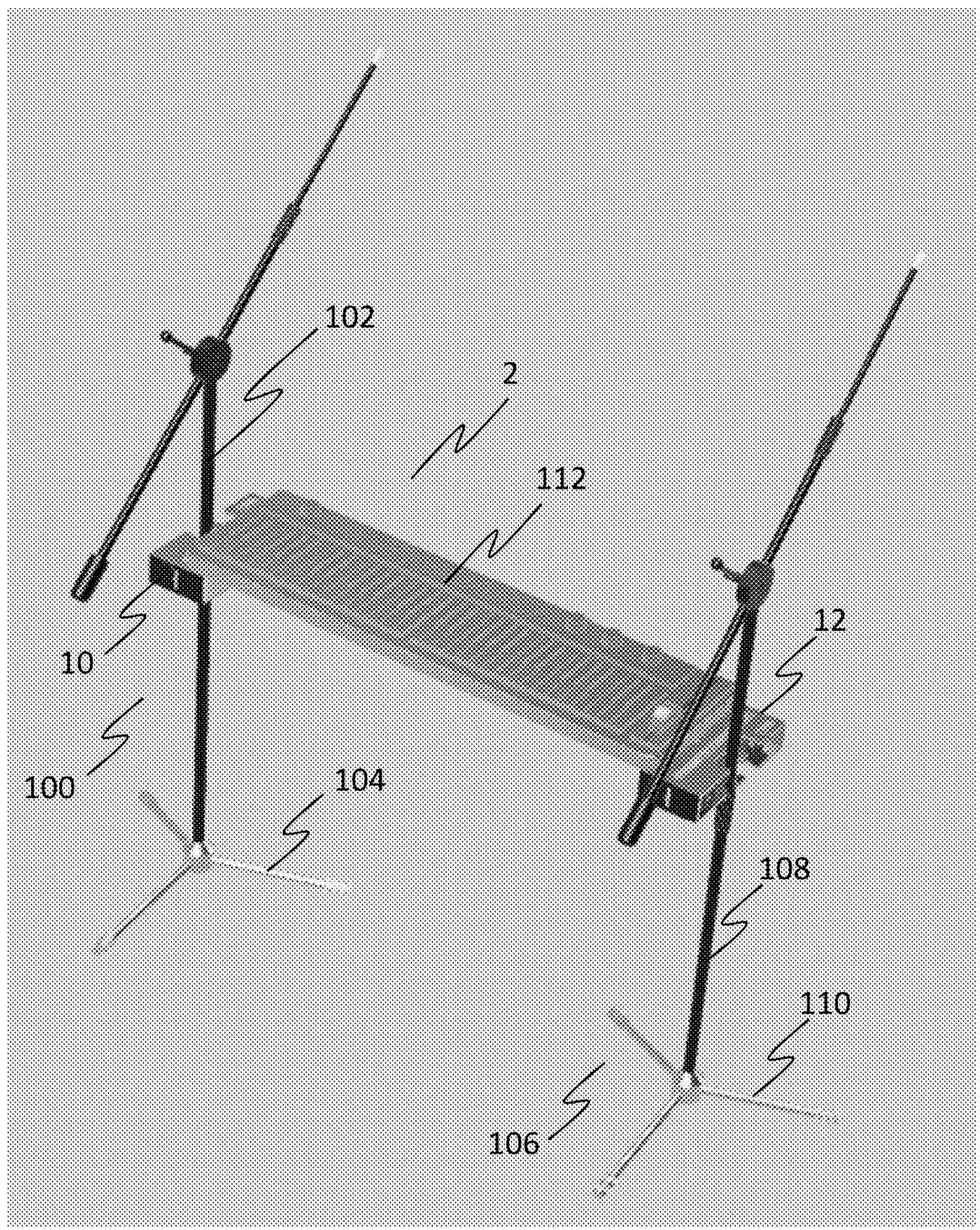
FIG. 5 shows the embodiment shown in FIG. 1 secured to first and second microphone stands supporting an electronic musical keyboard in a first orientation.

Once the apparatus 2 has been secured to the microphone stands 100, 106 the amount of extension of the body member 4 can be adjusted to accommodate a musical keyboard 112 placed on the body member 4, as shown in FIG. 5. The amount of extension could, of course, be adjusted prior to attaching the apparatus 2 to the microphone stands 100, 106.

In order to remove the apparatus 2, the clamping element 74 of the second clamping arrangement 12 is pressed against the spring 90 to realign the recesses 84, 86 in the clamping element 72 into alignment with the recesses 64, 66, 68, 70 provided in the upper and lower walls 48, 50 of the cassette 46 so that the second clamping arrangement 12 can be removed from the second microphone stand 106. The same process is followed for the first clamping arrangement 10 and the first microphone stand 100 in order to completely remove the apparatus 2 from the microphone stands 100, 106. The body member 4 can then be contracted as shown in FIG. 3 for transport and/or storage.

The apparatus 2 provides a convenient and compact means for supporting an electronic keyboard or similar device between two microphone stands. Since microphone stands are relatively numerous at venues, the apparatus provides a desirable alternative to conventional musical keyboard supports. The apparatus also provides ergonomic support since it does not require a central support and so does not obstruct a user's legs. In addition, the apparatus provides a stable supporting arrangement since a user can stand without interfering with the microphone stands to which the apparatus 2 is attached.

It will be appreciated that the order in which the clamping arrangements 10, 12 are secured to the stands 100, 106 and the stage at which the body member 4 is extended can be chosen according to a user preference at the time of assembly.

Figure 6:
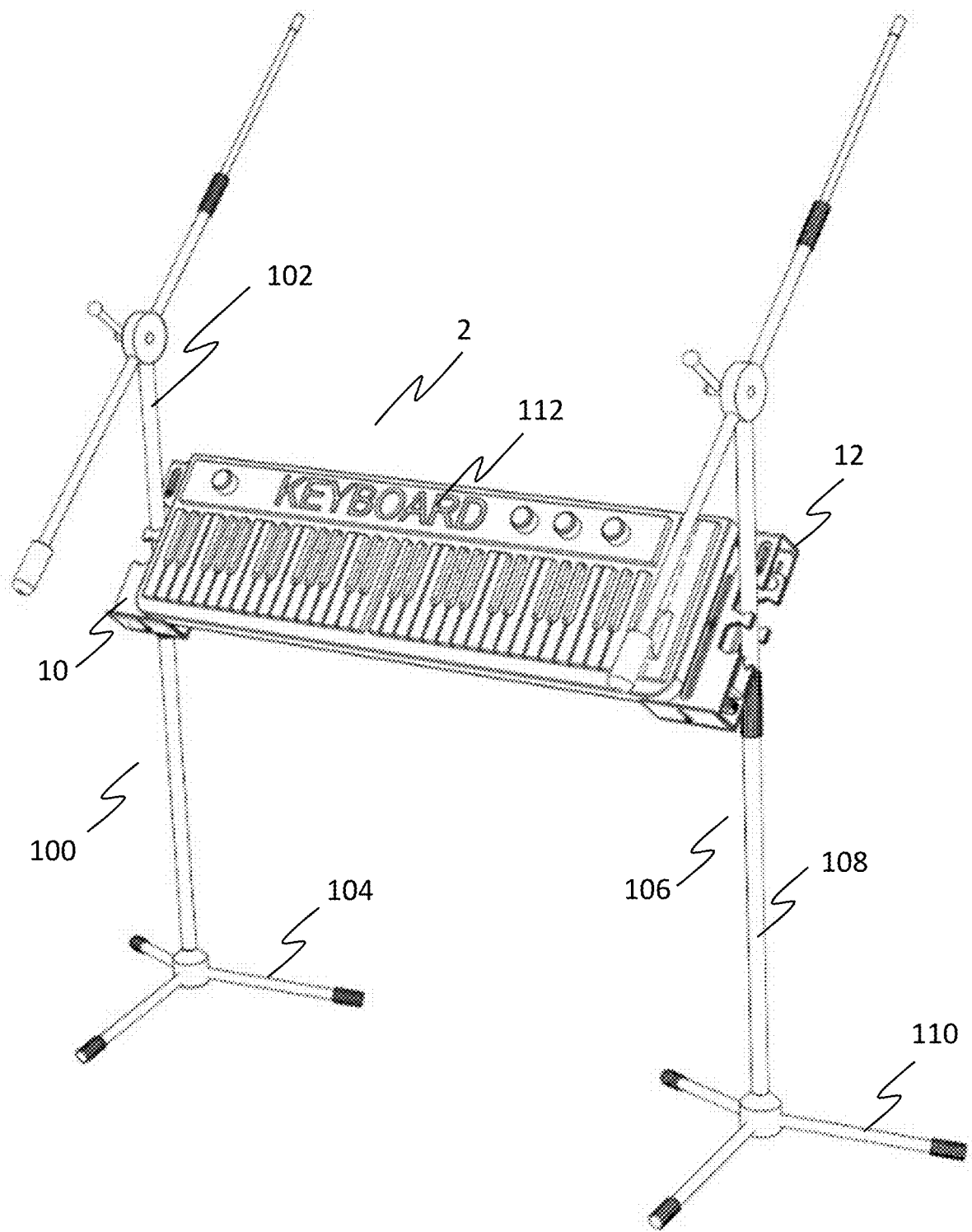
FIG. 6 shows the embodiment shown in FIG. 1 secured to first and second microphone stands supporting an electronic musical keyboard in a second orientation.

FIG. 6 shows an alternative arrangement of the apparatus 2 described with respect to FIGS. 1 to 6 in which an upright portion 102, 108 of each microphone stand is inserted into both of the adjacent recesses in the cassettes 18, 46 such that upper surfaces of the support elements 14, 16 of the body member 4 are inclined to the horizontal. This arrangement has the advantage that the keyboard 112 can be supported at an angle on a vertical portion of a microphone stand such that it is tilted towards a user.

Figure 7:
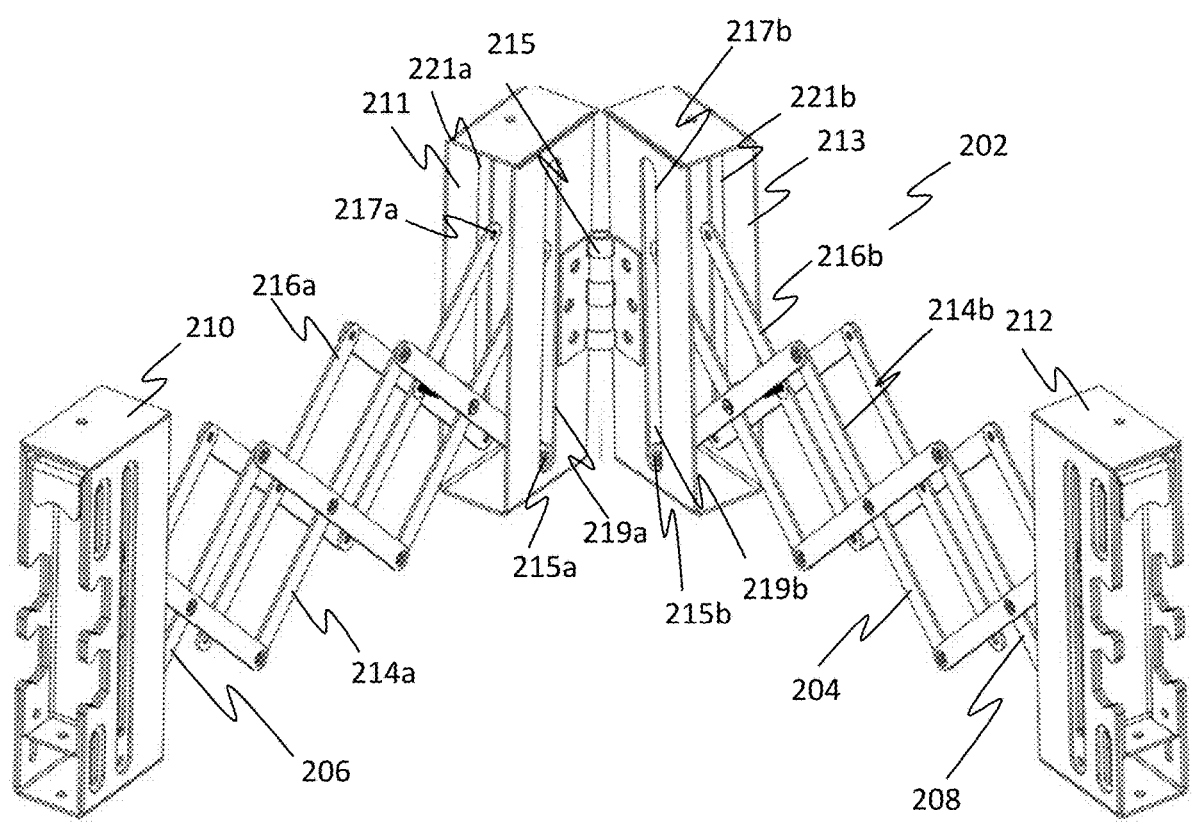
FIG. 7 shows a second embodiment of an apparatus for supporting a musical keyboard between two microphone stands.

FIG. 7 shows an alternative embodiment of an apparatus 202 for supporting a musical keyboard between two microphone stands. The apparatus 202 is a variation of the apparatus 2 described with respect to FIGS. 1 to 6. The apparatus 202 comprises a body member 204 having a first end portion 206 and a second end portion 208. A first clamping arrangement 210 is secured to the first end portion 206. A second clamping arrangement 212 is secured to the second end portion 208. The first and second clamping arrangements 210, 212 are the same as the clamping arrangements described with respect to FIGS. 1 to 6, although fewer details are shown in FIG. 7.

The body member 204 comprises first and second joining elements 211, 213 which are pivotally connected to each other by a hinge 215. A plurality of support elements 214a, 216a and 214b, 216b extending between the first clamping arrangements and the first joining element 211 and the second clamping arrangement and the second joining element 213, respectively. The support elements 214a, 216a, 214b, 216b are otherwise arranged in the same manner as the support elements of the embodiment shown in FIGS. 1 to 6 and are connected to the first and second joining elements 211, 213 via pins 215a, 217a and 215b, 217b extending through respective slots 219a, 221a, 219b, 221b such that the pins 215a, 217a and 215b, 217b extending can slide within the respective slots 219a, 221a, 219b, 221b thereby allowing the body member 204 to expand and contract. Each joining element 211, 213 is provided with a cavity which can receive contracted support elements 214a, 214b, 216a, 216b in a manner similar to the cassettes of the embodiment shown in FIGS. 1 to 6. The apparatus 204 can therefore be collapsed and folded into a very compact arrangement for storage and transport.

Figure 8:
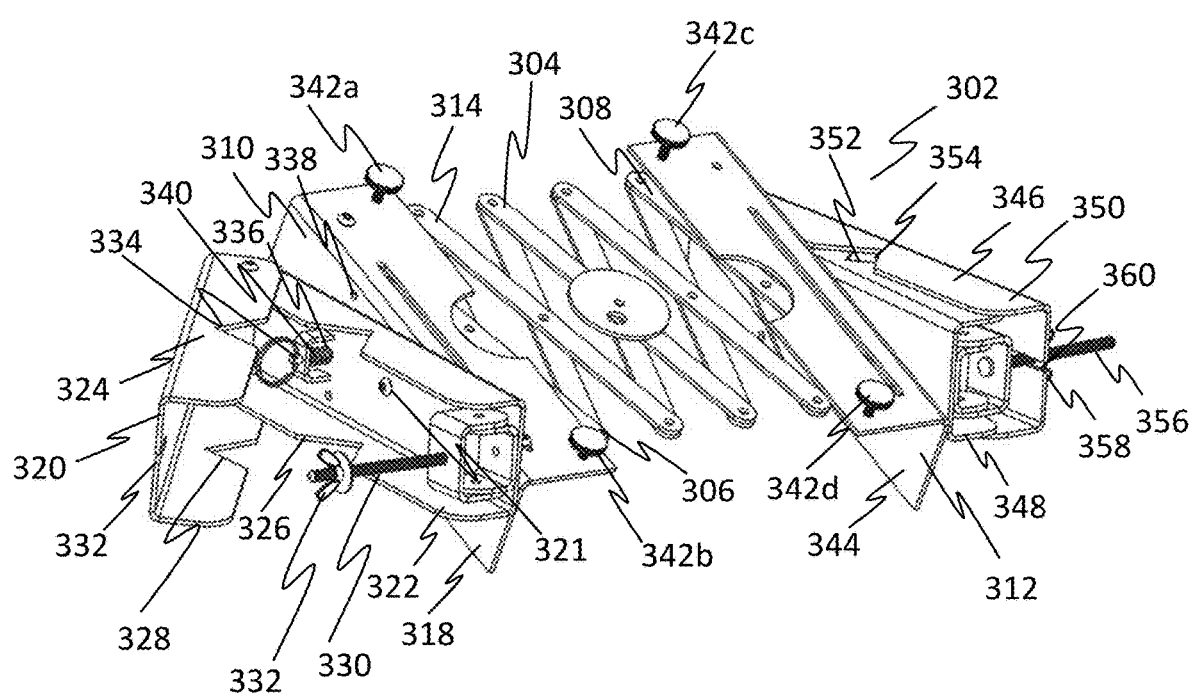
FIG. 8 shows a third embodiment of an apparatus for supporting a musical keyboard between two microphone stands.

FIG. 8 shows an alternative embodiment of an apparatus 302 for supporting a musical keyboard between two microphone stands. The apparatus 302 is a variation of the apparatus 2 described with respect to FIGS. 1 to 6. The apparatus 302 comprises a body member 304 having a first end portion 306 and a second end portion 308. A first clamping arrangement 310 is secured to the first end portion 306. A second clamping arrangement 312 is secured to the second end portion 308.

The body member 304 comprises a plurality of support elements 314 which are pivotally connected to each other to form an extendable arrangement. The support elements 314 are arranged in the same manner as the upper support elements 14 of the embodiment described with respect to FIGS. 1 to 6.

The first clamping arrangement 310 comprises a first bracket 318, which is connected to the support elements 314 by a pin and slot arrangement in accordance with the embodiment described with respect to FIGS. 1 to 6, and a first clamping mechanism 320 which is pivotably connected to the first bracket 318 by a pin 321 such that the first clamping mechanism 320 can rotate with respect to the first bracket 318 about an axis defined by the pin 321 which extends parallel to the direction in which the body member 304 extends and contract longitudinally.

The first clamping mechanism 320 comprises first and second jaws 322, 324 which are connected to each other such that the jaws 322, 324 can be rotated open and closed. Each jaw 322, 324 has a respective recess 326, 328 provided in it which is configured to receive an upright portion, such as a pole, of a microphone stand. In the embodiment shown, each recess is v-shaped. A fastener 330, 332 in the form of a bolt 330 and nut 332 arrangement is pivotably connected to the first jaw 322 by a clevis arrangement such that it can be pivoted into engagement with a corresponding slot 332 provided in the second jaw 324 and then tightened.

A locking pin 334 is provided on the first jaw 322. The pin 334 is arranged to slidably extend through a hole 336 in the first jaw 322 such that it can be selectively inserted into one of a plurality of holes 338 provided in the first bracket 318. The pin 334 is resiliently biased towards the first bracket 318 by a compression spring arrangement 340 such that release of the pin urges the pin 334 through a hole 336 with which it is aligned.

Fasteners 342a, 342b are provided on the first bracket 318 for securing an electronic musical keyboard to the first bracket 318.

The second clamping arrangement 312 is constructed in the same manner as the first clamping arrangement 310 and so comprises a second bracket 344 which is connected to the support elements 314 by a pin and slot arrangement in the same manner as the first bracket 318, and a second clamping mechanism 346 which is pivotably connected to the second bracket 344 such that the second clamping mechanism 312 can rotate with respect to the second bracket 344 about an axis which extends parallel to the direction in which the body member 304 extends and contracts.

The second clamping mechanism 346 comprises first and second jaws 348, 350 which are connected to each other such that the jaws 348, 350 can be rotated open and closed. Each jaw 348, 350 has a respective recess 352, 354 provided in it which is configured to receive an upright portion, such as a pole, of a microphone stand. In the embodiment shown, each recess 352, 354 is v-shaped. A fastener 356, 358 in the form of a bolt 356 and nut 358 arrangement is pivotably connected to the first jaw 348 such that it can be pivoted into engagement with a corresponding slot 360 provided in the second jaw 350.

A locking pin (not visible) is provided on the second bracket 344. The pin is arranged to slidably extend through a hole (not visible) in the first jaw 348 such that it can be selectively inserted into one of a plurality of holes (not visible) provided in the second bracket 344. The pin is resiliently biased towards the second bracket 344 by a compression spring arrangement (not visible) such that release of the pin urges the pin through a hole (not visible) with which it is aligned.

In order to secure the apparatus 302 to the first microphone stand 100 and the second microphone stand 106, the second jaw 324 is pivoted open with respect to the first jaw 322 to receive an upright portion 108 of a microphone stand 106. The upright portion 108 is then inserted between the jaws 322, 324 and aligned with the recesses 326. The jaws 322, 324 are then pivoted closed and secured together by the fastener 330, 332 thereby securing the first clamping arrangement 310 to the first microphone stand 100. It will be appreciated that the angle of orientation of the first jaw 322 can be set by pulling on the pin 334 to disengage it form the first bracket 318, adjusting the angle of the first jaw 322 with respect to the first bracket 318 and releasing the pin 334 into a hole in the first bracket 318 at the desired angle.

The same process is repeated with the second clamping arrangement 312 and a second microphone stand 106 in order to secure the second clamping arrangement 312 to the second microphone stand 106.

Figure 9:
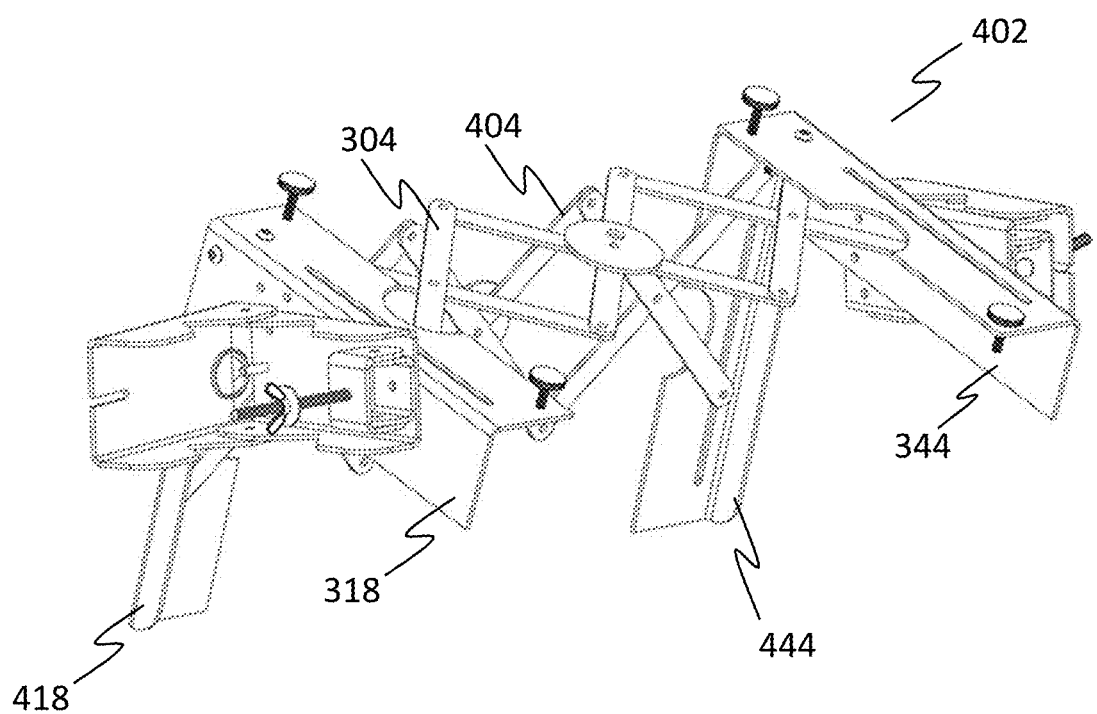
FIG. 9 shows a fourth embodiment of an apparatus for supporting a musical keyboard between two microphone stands.
Figure 10:
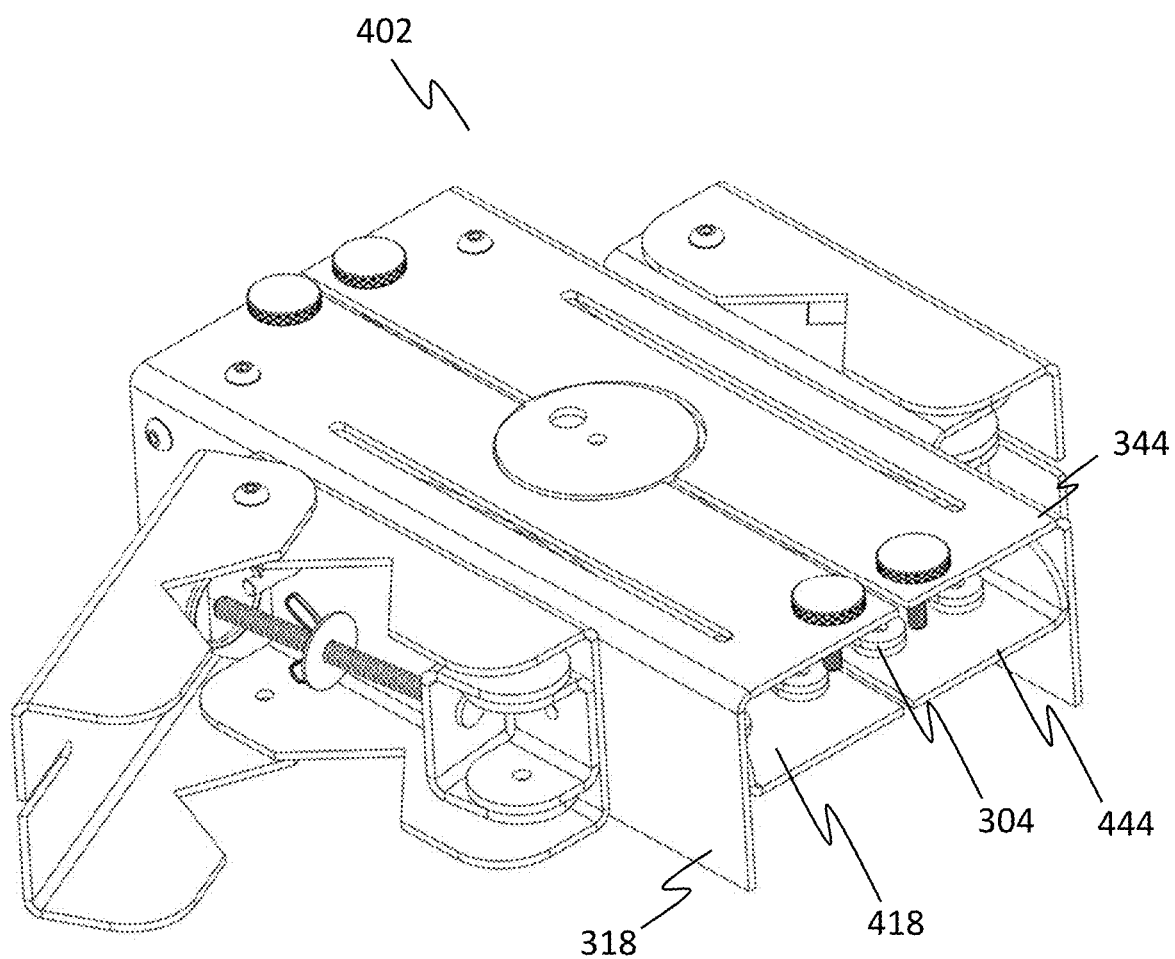
FIG. 10 shows the embodiment shown in FIG. 9 in an unextended configuration.

FIGS. 9 and 10 show an alternative embodiment of an apparatus 402 for supporting a musical keyboard between two microphone stands. The apparatus 402 is a variation of the apparatus 302 described with respect to FIG. 8. However, the apparatus 402 further comprises a third bracket 418 which is pivotably connected to the first bracket 318 and a fourth bracket 444 which is pivotably connected to the second bracket 344.

A second body member 404 having a first end portion 406 which is secured to the third bracket 418 and a second end portion 408 which is secured to the fourth bracket 444. The second body member 404 is configured in the same way as the first body member 304 which allows it to expand and collapse.

The second body member 404 and the third and fourth brackets 418, 444 pivot between an open configuration and a closed configuration. In the open configuration, the plane in which the second body member 404 extends is perpendicular to the plane in which the body member 304 extends. The position of the first body member 304 and the second body member 404 may be locked in the open configuration by locking mechanisms (not shown) provided on the third and fourth brackets 418, 444. The arrangement provides improved rigidity and resistance to flexing and twisting.

In the closed configuration, the second body member 404 extends in a plane which is parallel with and spaced away from the plane in which the body member 304 extends, which makes it compact for easy transportation and/or storage.

Figure 11:
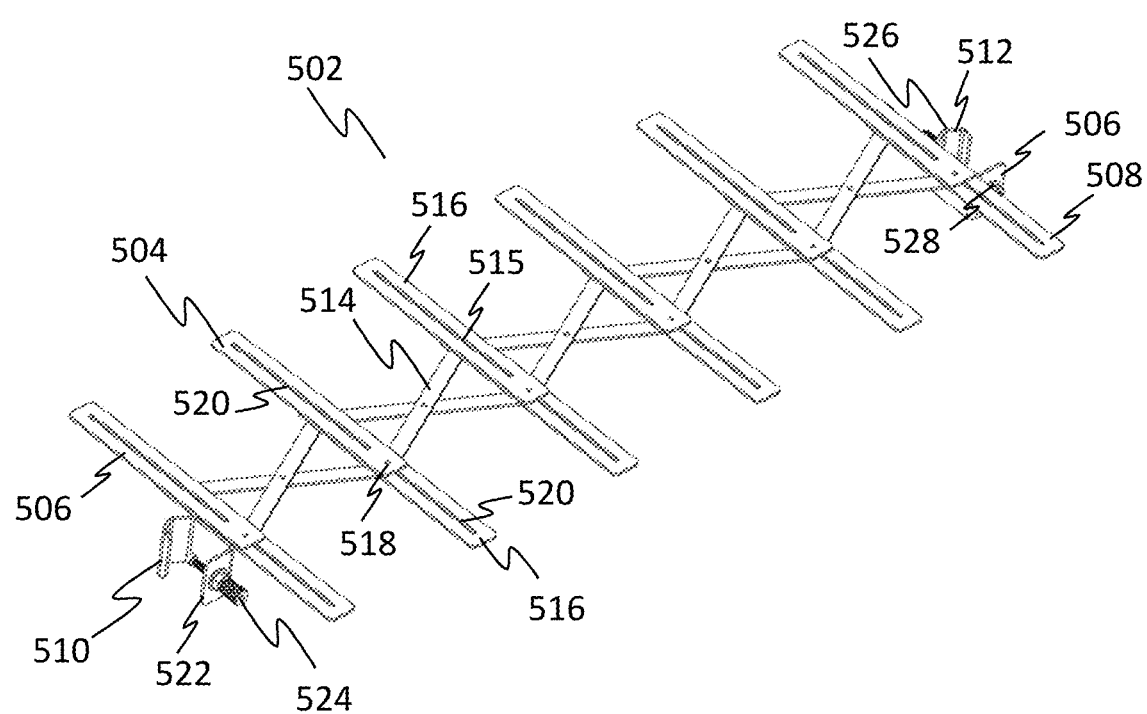
FIG. 11 shows a fifth embodiment of an apparatus for supporting a musical keyboard between two microphone stands.
Figure 12:
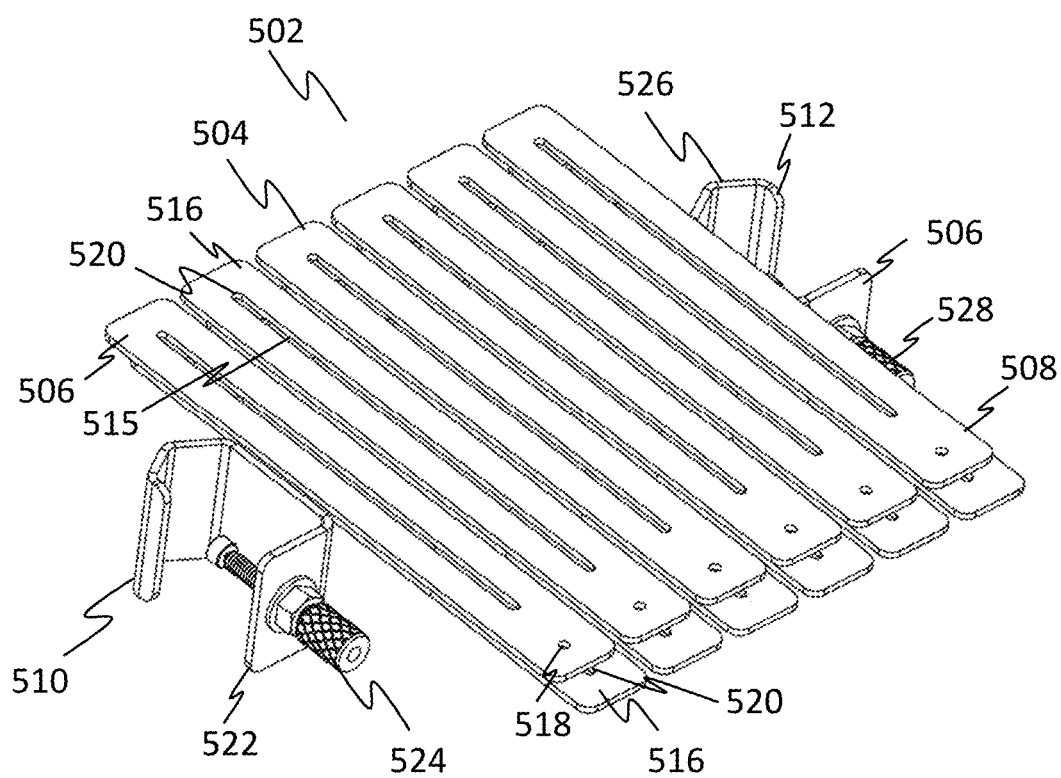
FIG. 12 shows the embodiment shown in FIG. 11 in an unextended configuration.

FIGS. 11 and 12 show an alternative embodiment of an apparatus 502 for supporting a musical keyboard between two microphone stands. The apparatus 502 is a variation of the apparatus 2 described with respect to FIGS. 1 to 6. The apparatus 502 comprises a body member 504 having a first end portion 506 and a second end portion 508. A first clamping arrangement 510 is secured to the first end portion 506. A second clamping arrangement 512 is secured to the second end portion 508.

The body member 504 comprises a plurality of support elements 514 which are pivotally connected to each other in a manner corresponding to the support members 14 of the embodiment shown in FIGS. 1 to 5, to form an extendable arrangement. That is to say, the support elements 514 are arranged in five pairs, the support elements 514 of each pair are pivotally connected to each other at their respective centres to form a cross-linked arrangement. The ends of each pair of the support elements 514 are also pivotally connected to respective ends of adjacent pairs of support elements 514 by respective pin members 515. Pairs of support members 516 in the form of plates are arranged to extend perpendicularly with respect to the extending/contracting direction of the body member 504 across the intersection of each pair of support elements 514. Each plate 516 has a through hole 518 through which a pin member 515, connecting one of the support elements 514 of a pair of adjacent support elements 514 to another one of the support elements 514 of an adjacent pair of support elements, extends. Each plate has a slot 520 which receives the pin connecting the other support element 514 of each of said pair of adjacent support elements 514. Each pin member 515 is arranged to slide along the respective slot 520 in which it is received in order to allow the support elements 514 to pivot with respect to each other and so allow the body member 504 to expand and contract in a longitudinal direction.

The first clamping arrangement 510 is secured to one of the plates 516 (e.g. a lower plate) at the first end portion 506 and the second clamping arrangement 512 is secured to one of the plates 516 (e.g. a lower plate) at the second end portion 508.

The first clamping arrangement 510 comprises a curved plate 522 configured to receive an upright portion of a microphone stand in use and a fastener 524, in the form of a threaded screw extending through the curved plate 522, which is arranged to clamp an upright portion of a microphone stand within the curved plate 522. The second clamping arrangement 512 has a similar configuration, having a curved plate 526 and a fastener 528.

The apparatus 502 can be extended and collapsed in a manner which is similar to the previous embodiments and can be secured to first and second microphone stands using the clamping arrangements 510, 512. Once in situ, the plates 516, which move outwardly over each other in a direction perpendicular to the direction in which the body member 504 extends as the body member 514 is extended, provide a relatively wide support for a keyboard placed upon them. The body member 504 is therefore relatively broad when extended, which is desirable for supporting a musical keyboard, and relatively narrow when contracted, which is desirable for transport and/or storage.

Figure 13:
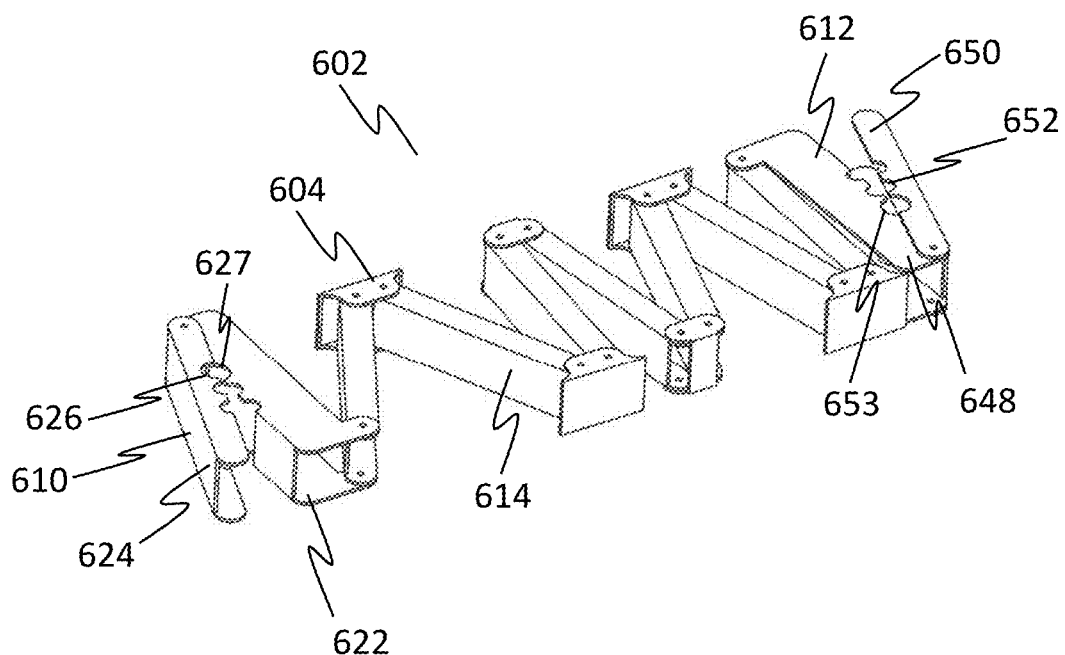
FIG. 13 shows a sixth embodiment of an apparatus for supporting a musical keyboard between two microphone stands.
Figure 14:
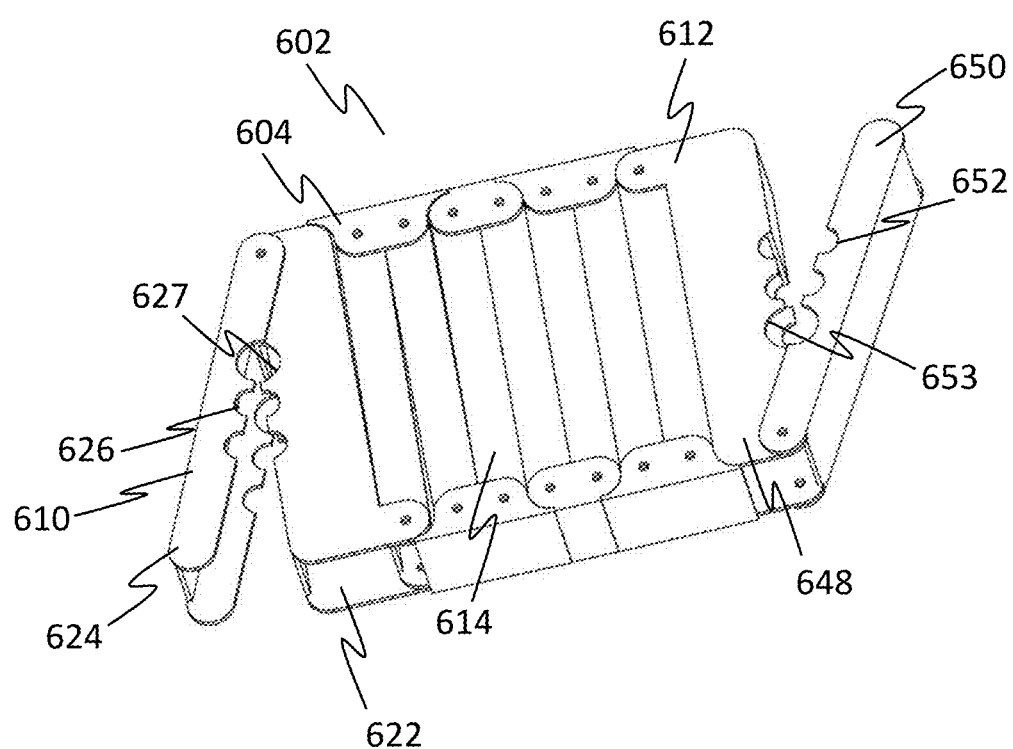
FIG. 14 shows the embodiment shown in FIG. 13 in an unextended configuration.

FIGS. 13 and 14 show an alternative embodiment of an apparatus 602 for supporting a musical keyboard between two microphone stands. The apparatus 602 is a variation of the apparatus 302 described with respect to FIG. 8; however, instead of being cross-linked, each support element 614 of a body member 604 is pivotally connected at its ends to a respective adjacent support member 614. The first clamping arrangement 610 comprises first and second pivotally connected jaws 622, 624. The first jaw 622 is pivotally connected to an end of a support element 614 at a first end portion 606 of the body member 604.

Each jaw 622, 624 has a set of three semi-circular recesses 626, 627 of different diameters provided in it for receiving upright portions of a microphone stand of different diameters and which allow for the apparatus 602 to be inclined with respect to a horizontal plane by inserting a microphone stand into adjacent recesses 626 in a manner similar to the arrangement shown in FIG. 6. The jaws 622, 624 may be held together by a fastening arrangement, such as the fastening arrangement of the embodiment shown in FIG. 8.

The second clamping arrangement 612 has a configuration which is the same as the configuration of the first clamping arrangement 610, and so comprises a pivotally connected first and second jaws 648, 650 having semi-circular recesses 652, 653.

Figure 15:
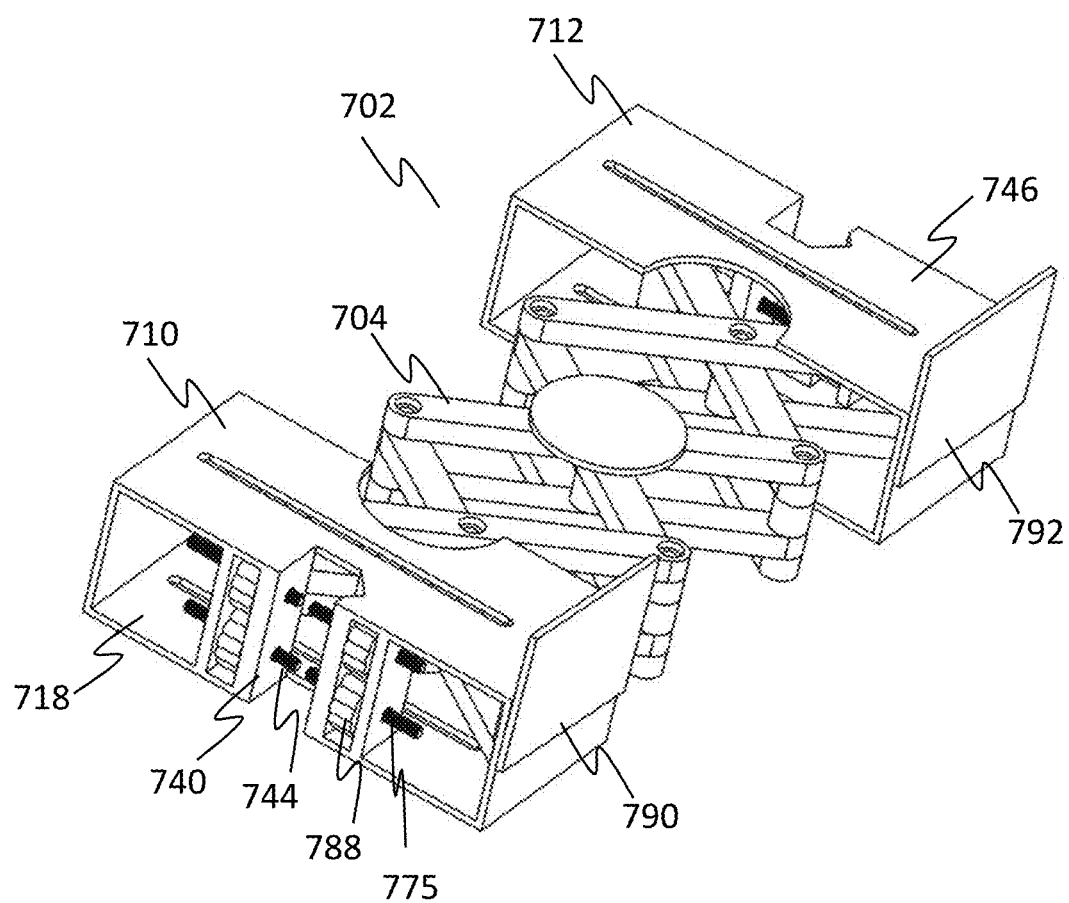
FIG. 15 shows seventh embodiment of an apparatus for supporting a musical keyboard between two microphone stands.
Figure 16:
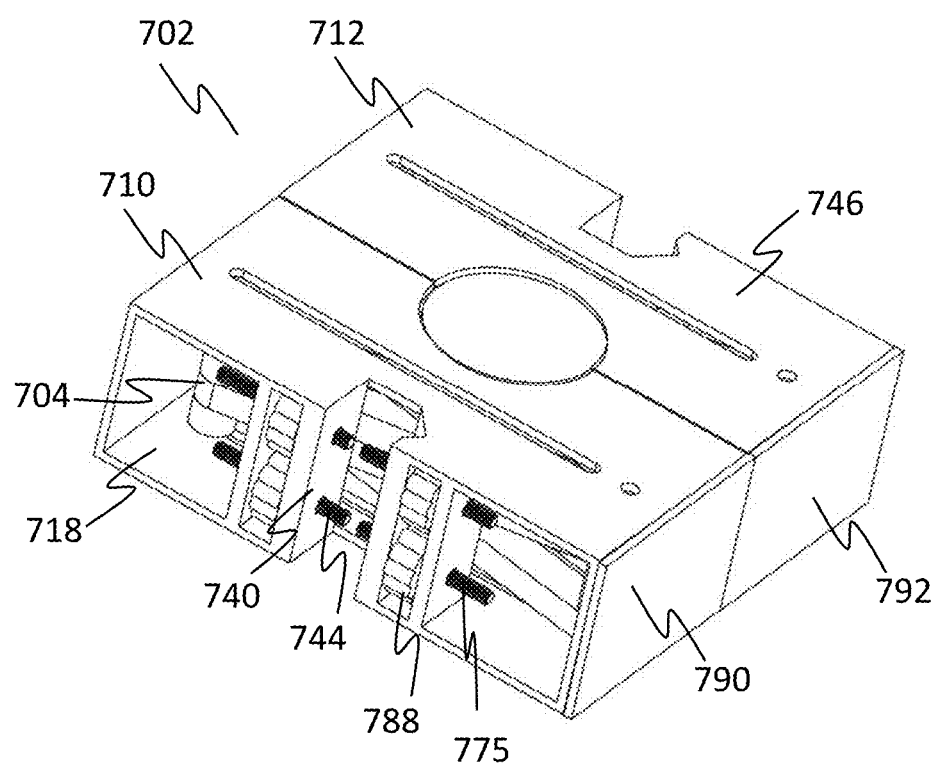
FIG. 16 shows the embodiment shown in FIG. 15 in an unextended configuration.

FIGS. 15 and 16 show an alternative embodiment of an apparatus 702 for supporting a musical keyboard between two microphone stands. The apparatus 702 is a variation of the apparatus 2 described with respect to FIGS. 1 to 6, having a similarly extendable body member 704 and first and second clamping arrangements 710, 712 comprising first and second cassettes 718, 746. The first clamping arrangement 710, however, comprises a single recess 740 and a clamping mechanism 744 which comprises four threaded rods 775 which each extend through holes in space apart walls of the recess 740 on opposing sides of the recess and are threadedly engaged with respective adjustment knobs 788 disposed between two of the walls on each side of the recess 740. Each knob 788 is held captive by the walls between which it is disposed such that rotation of each knob 788 in opposite directions causes the threaded rod 775 with which it is engaged to move in and out of the recess 740. Two of the four rods 775 are arranged opposite the other two of the four rods 775 so that an upright portion of a microphone stand disposed within the recess can be clamped between the opposing rods 775. The rods 775 can be moved independently of each other such that the apparatus 702 can be inclined with respect to microphone stands to which it is secured thereby allowing a musical keyboard supported by the apparatus 702 to be inclined towards or away from a user, as desired. The cassette 718 further comprises a plate 790 which is secured to an end face of the remainder of the cassette 718 and is arranged to pivot upwardly to provide a ledge for supporting a keyboard.

The second clamping arrangement 712 has an arrangement which is the same as the arrangement of the first clamping arrangement including a plate 792, although some of the components of the second clamping arrangement 712 are not visible in FIG. 15 or 16.

Figure 17:
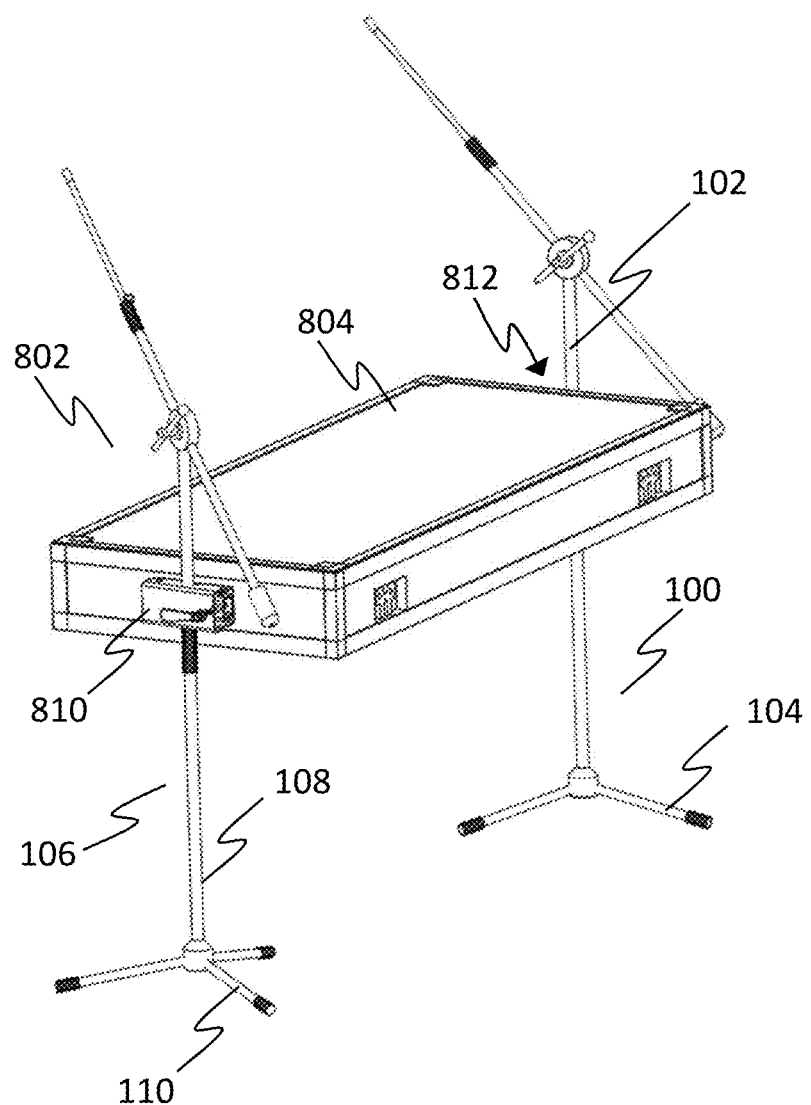
FIG. 17 shows an eighth embodiment of an apparatus for supporting a musical keyboard connected to two microphone stands.
Figure 18:
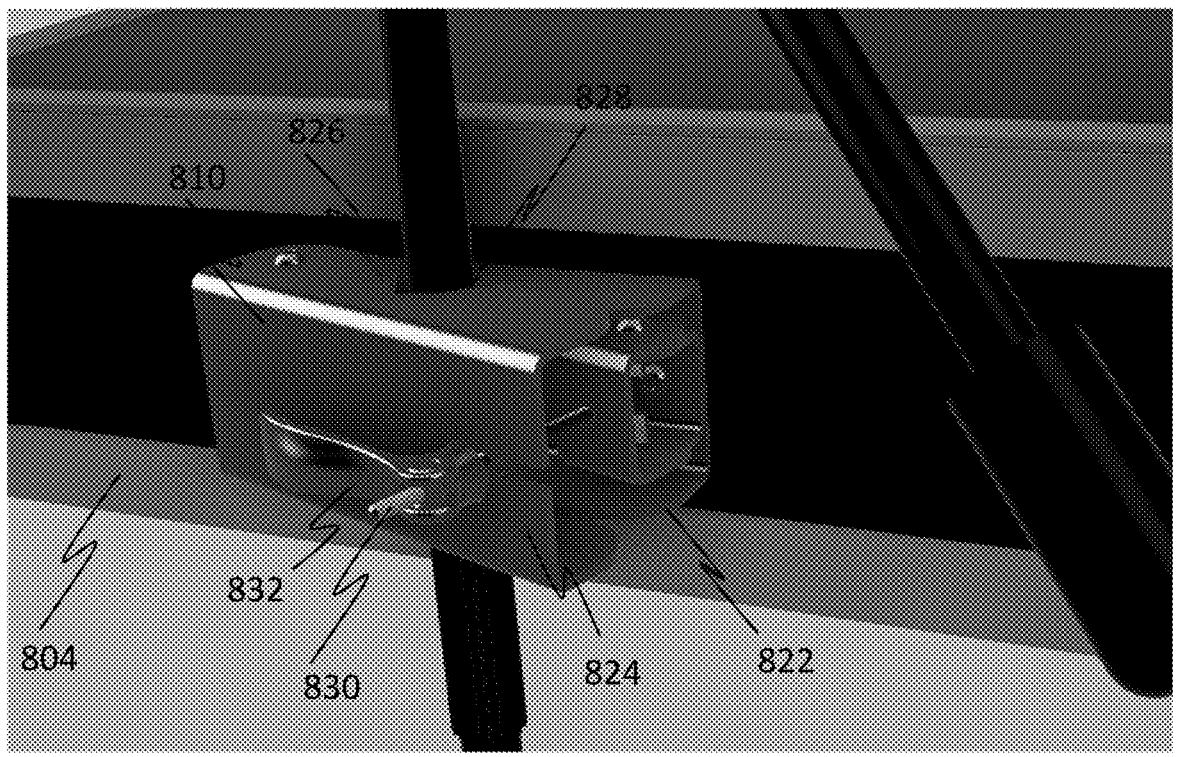
FIG. 18 shows a portion of the embodiment shown in FIG. 17.

FIGS. 17 and 18 show an alternative embodiment of an apparatus 802 for supporting a musical keyboard between two microphone stands. The body member 804 is provided by a travel/storage case for an electronic keyboard having a first end portion 806 and a second end portion 808.

The first and second clamping arrangements 810, 812 (the second is indicated generally) have a configuration which is the same as the first and second clamping mechanisms 320, 346 described with respect to the embodiment shown in FIG. 8. The first clamping arrangement 810 therefore comprises first and second pivotally connected jaws 822, 824, a fastener 830, 832 in the form of a bolt 830 (which also has an integrated cam arrangement for providing a conventional quick-release function) and nut 832. Each jaw 822, 824 has a respective recess 826, 828 provided in it which is configured to receive an upright portion, such as a pole, of a microphone stand. In the embodiment shown, each recess is v-shaped. The clamping arrangements 810, 812, however, are secured directly to the ends of the body member 804 (i.e.

the travel storage case) and so do not have an intervening bracket and pin arrangement connecting the clamping mechanism which allows rotation. A bracket such as the bracket of the embodiment shown in FIG. 8 could, however, be provided if desired.

Figure 19:
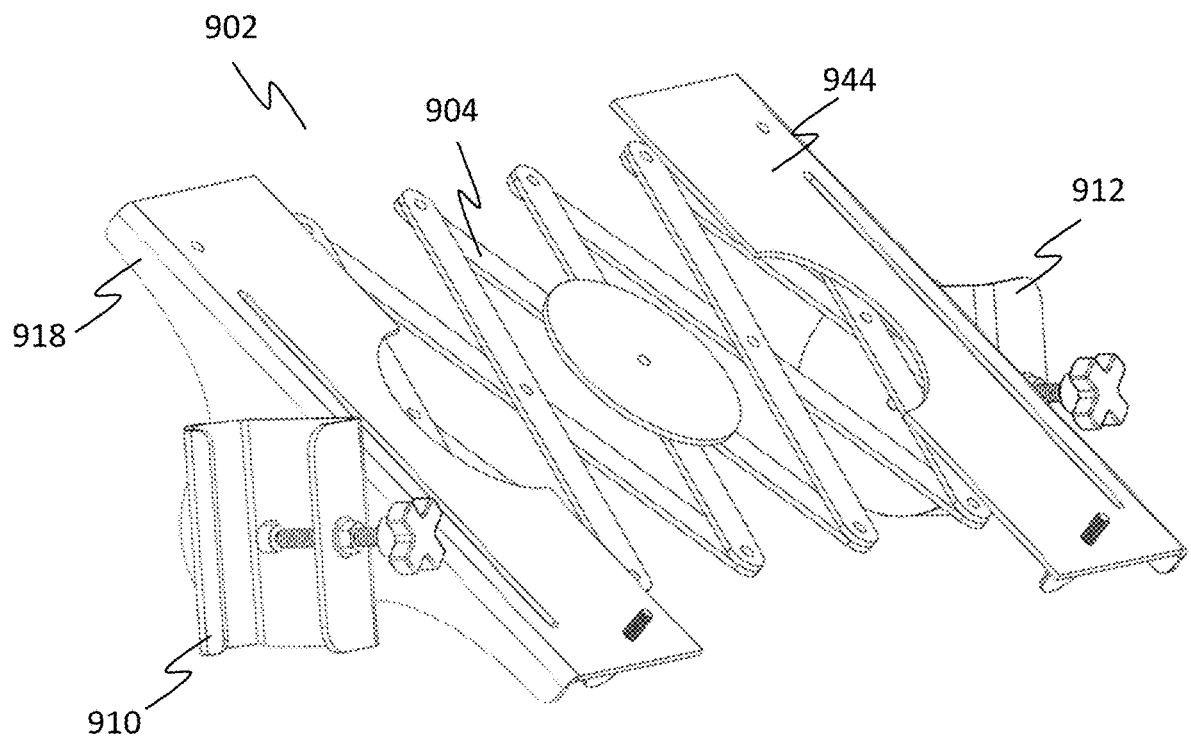
FIG. 19 shows a ninth embodiment of an apparatus for supporting a musical keyboard connected to two microphone stands.

FIG. 19 shows an alternative embodiment of an apparatus 902 for supporting a musical keyboard between two microphone stands. The apparatus 902 is a variation of the apparatus 302 described with respect to FIG. 8. The first and second clamping arrangements 910, 912 have a construction similar to the first and second clamping arrangements 510, 512 described with respect to the embodiment shown in FIG. 11. The first and second clamping arrangements 910, 912 are, however, pivotally mounted to first and second brackets 918, 944, respectively to allow the body member 904 to be pivoted with respect to the clamping arrangements 910, 912.

Figure 20:
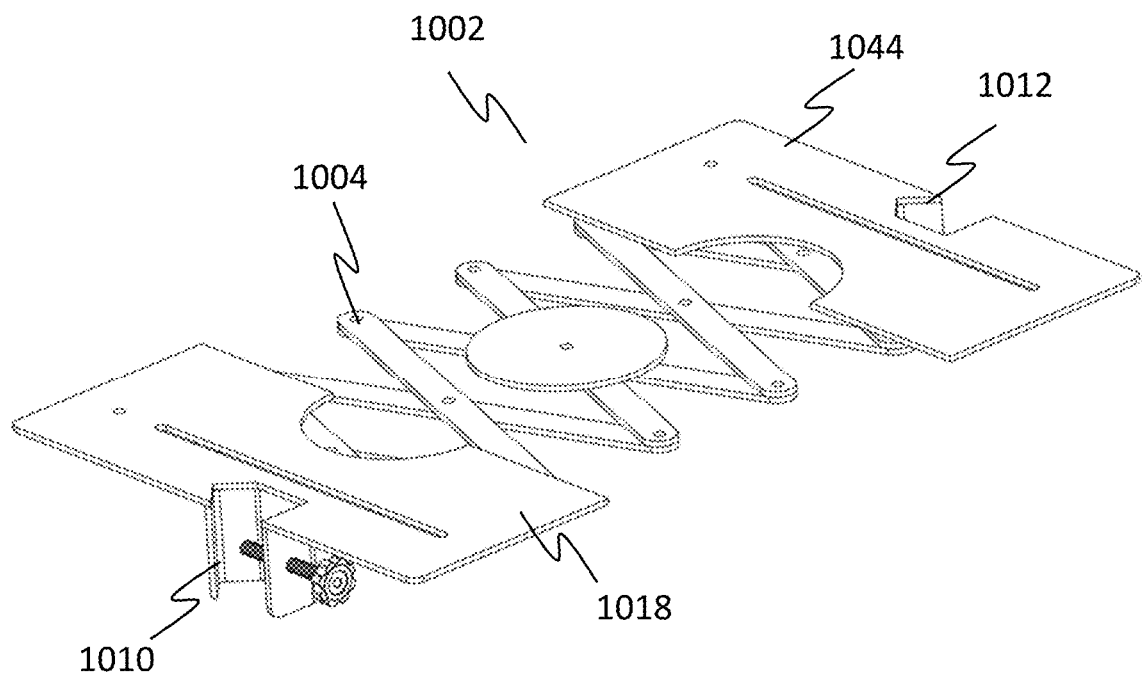
FIG. 20 shows a tenth embodiment of an apparatus for supporting a musical keyboard connected to two microphone stands.

FIG. 20 shows an alternative embodiment of an apparatus 1002 for supporting a musical keyboard between two microphone stands. The apparatus 1002 is a variation of the apparatus described with respect to FIG. 19. Each bracket 1018, 1044 comprises a flat plate having a recess at one side opposite the body member 1004. The first and second clamping arrangements 1010, 1012, are located below each respective recess and are fixed with respect to the brackets 1018, 1044, respectively.

Figure 21:
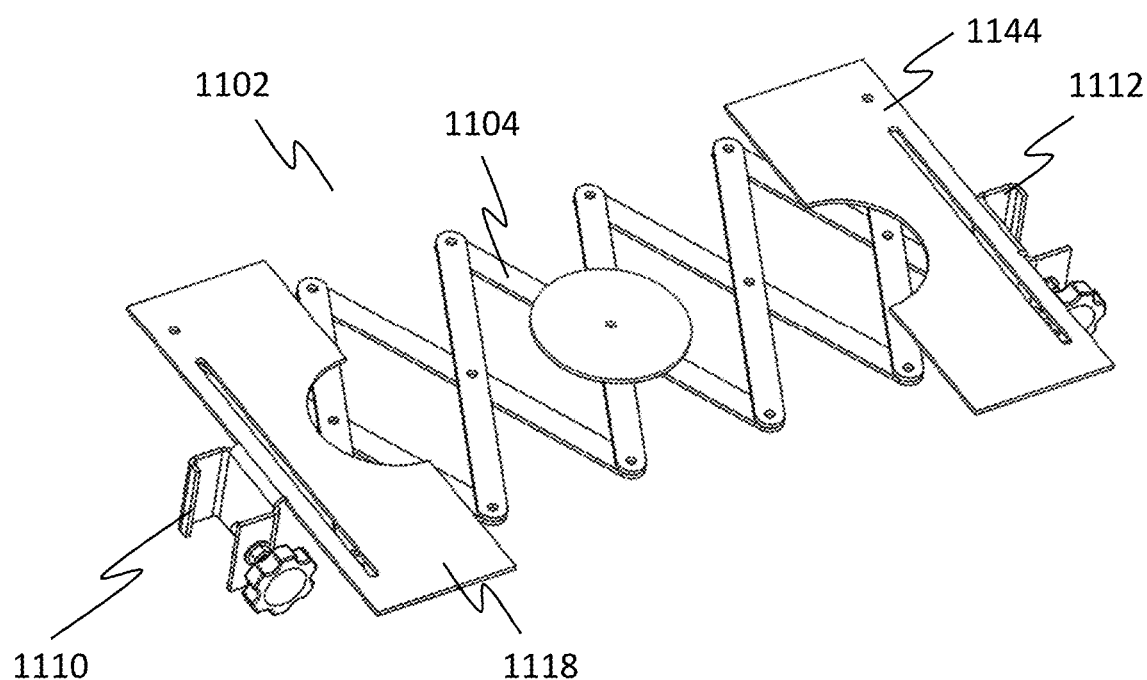
FIG. 21 shows an eleventh embodiment of an apparatus for supporting a musical keyboard connected to two microphone stands.

FIG. 21 shows an alternative embodiment of an apparatus on 1102 for supporting a musical keyboard between two microphone stands. The apparatus 1102 is a variation of the apparatus described with respect to FIG. 20. Each bracket 1118, 1144 and respective clamping arrangement 1110, 1112 is formed from a single flat metal plate, wherein each clamping arrangement 1110, 1112 is provided by a spur on a side opposite the body member 1104 folded downwardly and into a generally c-shaped configuration. Such an arrangement is relatively simple and inexpensive to manufacture.

Figure 22:
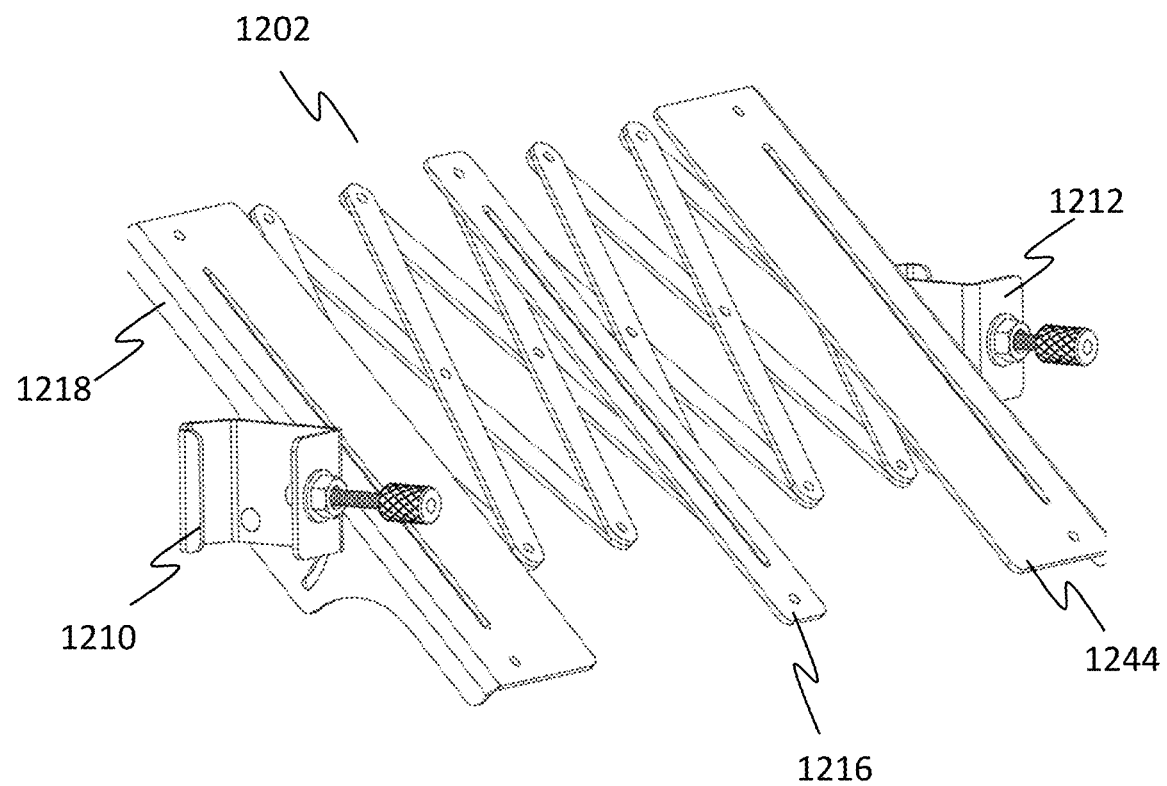
FIG. 22 shows a twelfth embodiment of an apparatus for supporting a musical keyboard connected to two microphone stands.

FIG. 22 shows an alternative embodiment of an apparatus 1202 for supporting a musical keyboard between two microphone stands. The apparatus 1202 is a variation of the apparatus described with respect to FIG. 19. The body member 1204, however, comprises a central support member 1216 which is configured in the same manner as each support member 516 described with respect to the embodiment shown in FIG. 11. The body member 1204 therefore provides three relatively wide supports including the central support member 1216 and the two brackets 1218, 1244 for an electronic keyboard.

Figure 23:
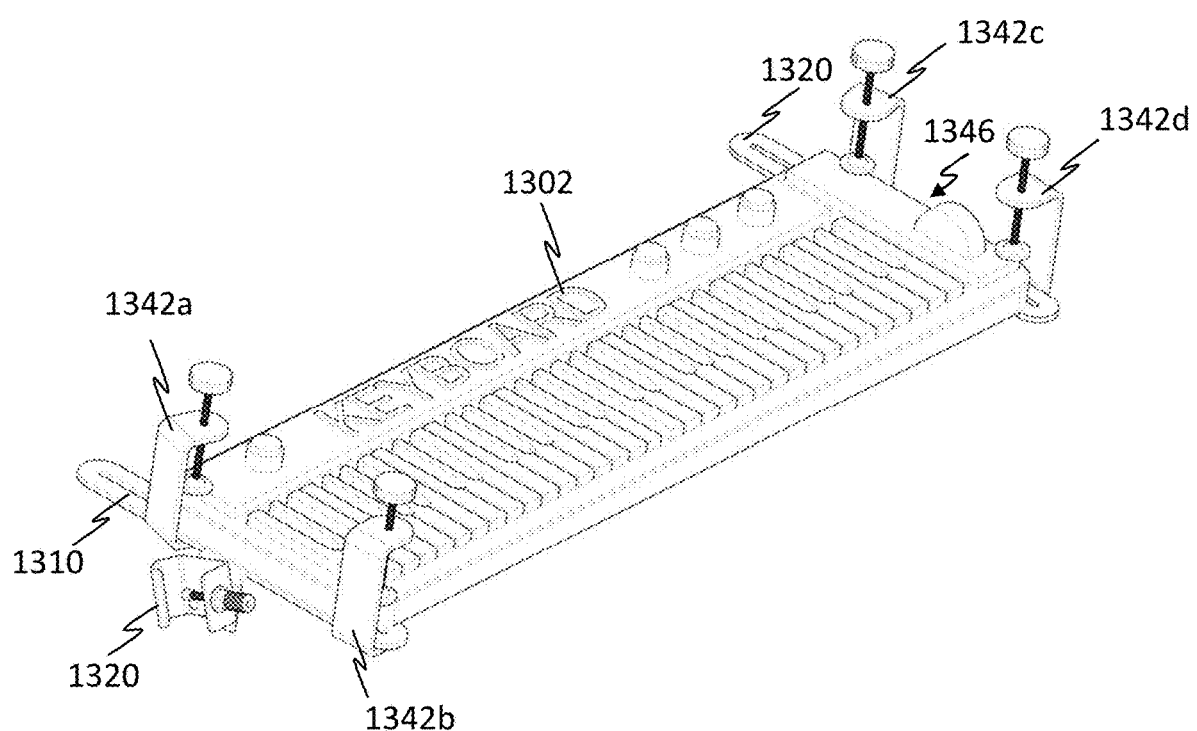
FIG. 23 shows a thirteenth embodiment of an apparatus for supporting a musical keyboard connected to two microphone stands.

FIG. 23 shows an apparatus 1302 for supporting a musical keyboard between two microphone stands. The apparatus 1302 comprises a first clamping arrangement 1310 having a first clamping mechanism 1320 configured to releasably clamp a first microphone stand and a second clamping arrangement 1312 having a second clamping mechanism 1346 (indicated generally) configured to releasably clamp a second microphone stand. The clamping mechanisms 1320, 1346 are substantially the same as the clamping arrangements shown in FIG. 22. The first clamping arrangement 1310 further comprises a securing mechanism 1342*a*, 1342*b* configured to be releasably secured to a first end portion of a musical keyboard. The second clamping arrangement 1312 also comprises a securing mechanism 1342*c*, 1342*d* configured to be releasably secured to a second end portion of a musical keyboard. The securing mechanisms 1342*a*, 1342*b*, 1342*c*, 1342*d* provide a clamping means that clamp against top and bottom surfaces of the keyboard. The securing mechanisms 1342*a*, 1342*b*, 1342*c*, 1342*d* are located in respective slots provided in first and second brackets 1318, 1344 of the clamping arrangements 1310, 1312, respectively, which allows them to be moved independently in a lateral direction in order to clamp a keyboard at a suitable location of the keyboard. It will be appreciated that other suitable securing means could be used, such as the securing means described with respect to the embodiments described above.

Figure 24:
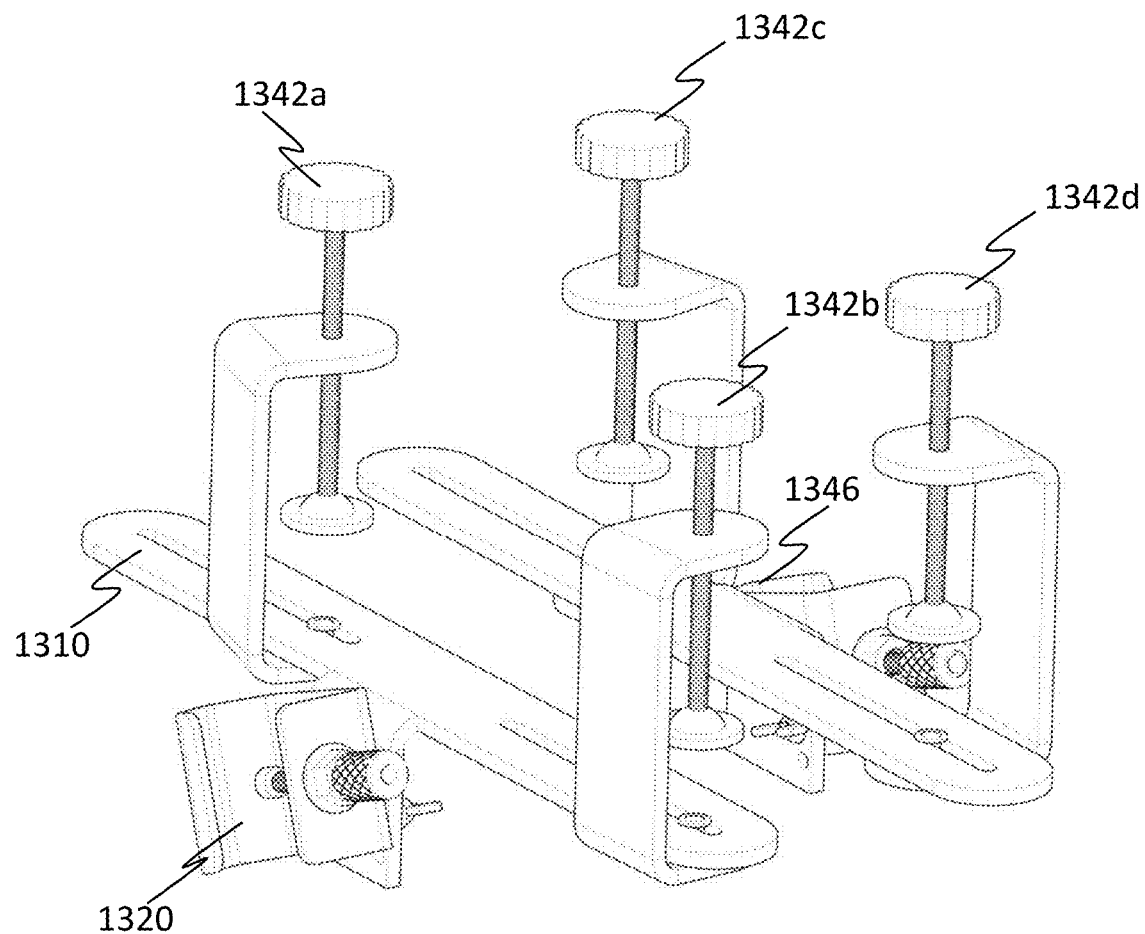
FIG. 24 shows the apparatus shown in FIG. 23 when not is use.

FIG. 24 shows the embodiment shown in FIG. 23 when not secured to a keyboard and ready for transport and/or storage.

Figure 25:
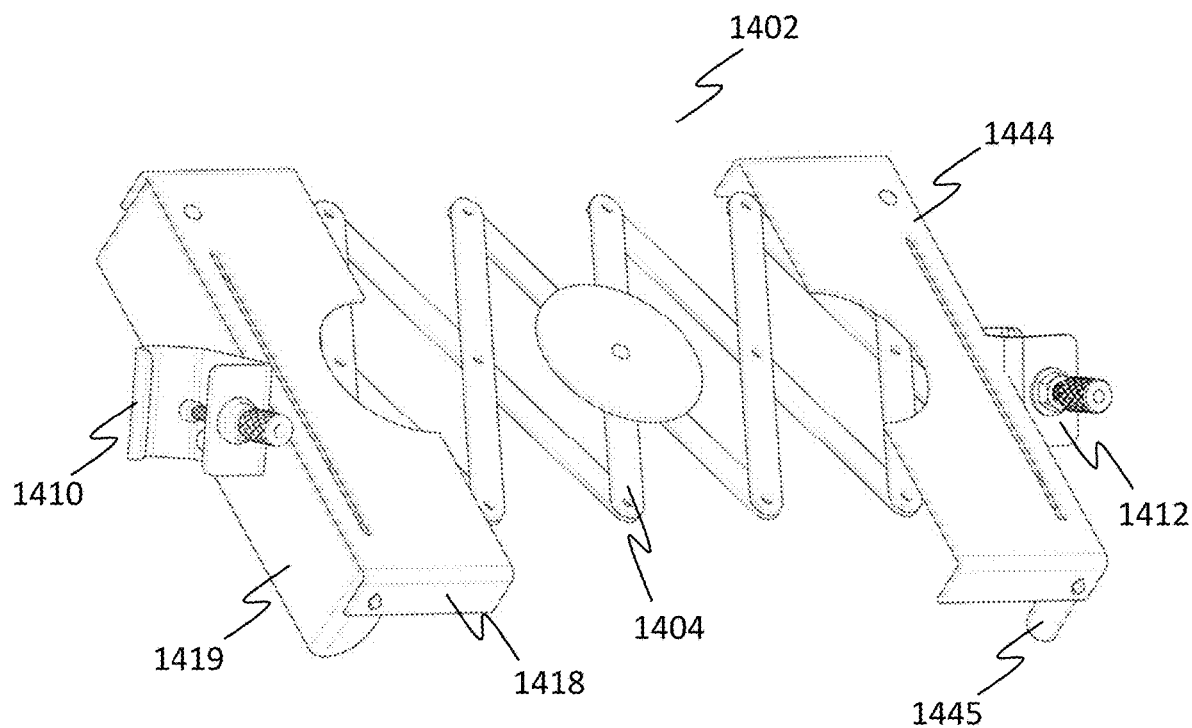
FIG. 25 shows a fourteenth embodiment of an apparatus for supporting a musical keyboard connected to two microphone stands.

FIG. 25 Shows an alternative embodiment of an apparatus 1402 for supporting a musical keyboard between 2 microphone stands. The apparatus 1402 is a variation of the apparatus described with respect to FIG. 22. Each clamping arrangement 1410, 1412, however, comprises two brackets 1418, 1419 and 1444, 1445 pivotally connected to each other, respectively. First and second brackets 1418, 1444 are connected to respective end portions of a body member 1404. A third bracket 1419 is pivotally connected to the first bracket 1418 and arranged to pivot downwardly and outwardly for use in order to provide additional structural support for the body member 1404. The clamping arrangement 1410 is pivotally connected to the third body member 1419 in a manner similar to the embodiment described with respect to FIG. 19. A fourth bracket 1445 is pivotally connected to the second bracket 1444 and arranged to pivot downwardly and outwardly for use in order to provide additional structural support for the body member 1404. The clamping arrangement 1412 is pivotally connected to the fourth body member 1445.

Figure 26:
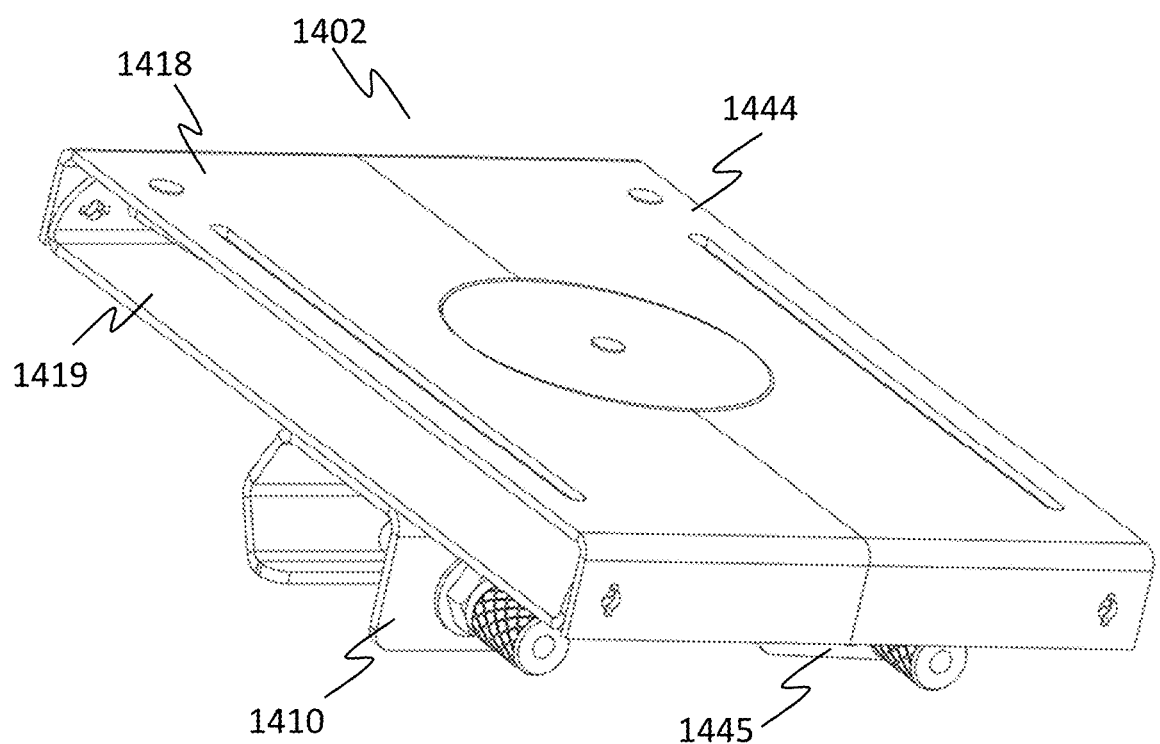
FIG. 26 shows the embodiment shown in FIG. 25 in an unextended configuration.

FIG. 26 shows the embodiment shown in FIG. 25 in a collapsed configuration for transport and/or storage.

It will be appreciated that in some circumstances other portions of a microphone stand could be used as attachment points, including portions which are or may be inclined to the vertical. Furthermore, the various clamping arrangement and body members described above with respect to the different embodiments of the apparatus may be used, where suitable, interchangeably to provide a desired configuration and/or functionality. Several apparatus may be connected to microphone stands such that they provide a modular arrangement which provides support for one or more devices.

Figure 27:
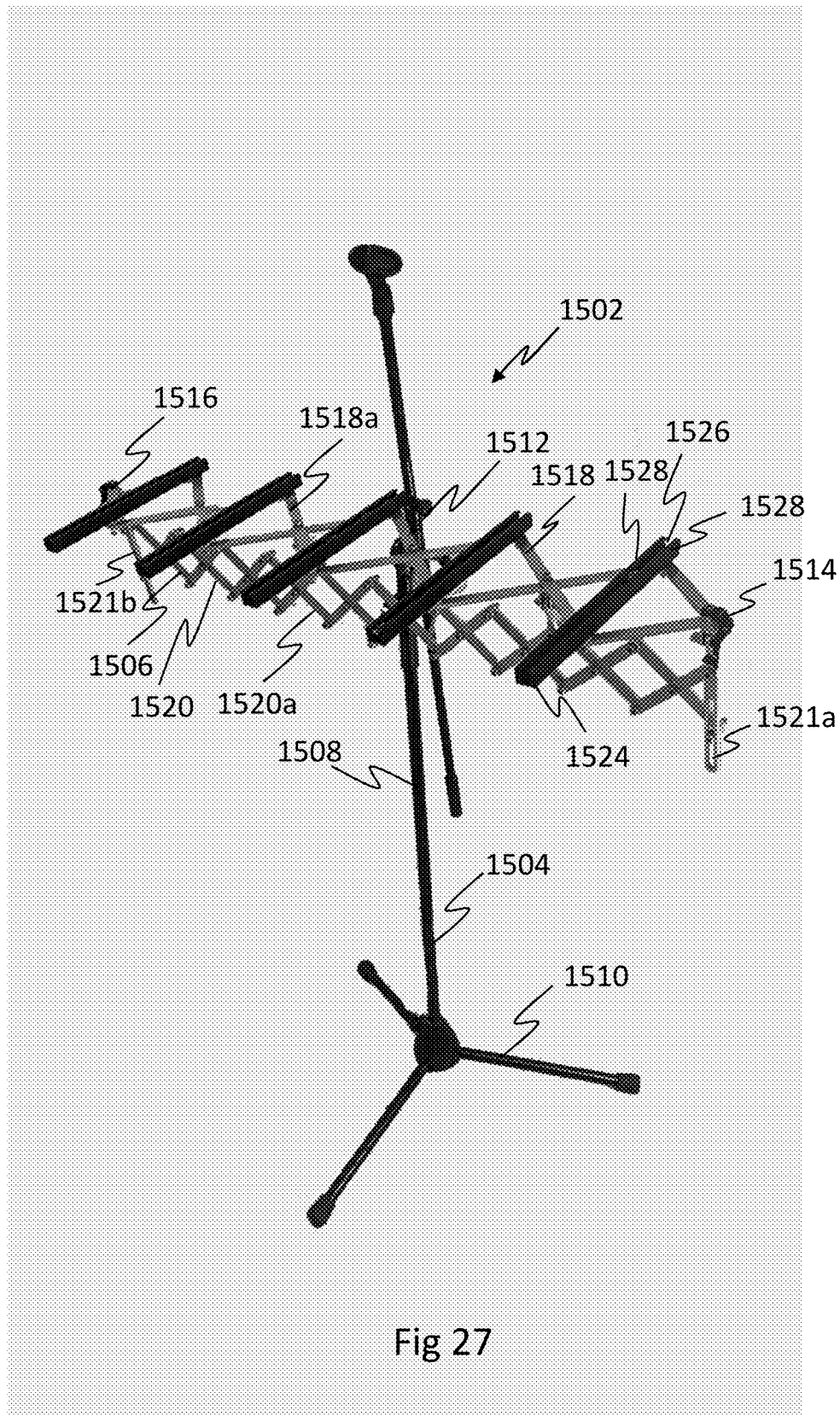
FIG. 27 shows an assembly comprising a microphone stand and support apparatus in a first configuration.

FIG. 27 shows an assembly 1502 comprising a microphone stand 1504 and a support apparatus 1506 secured to the microphone stand 1504. The microphone stand 1504 comprises an upright portion 1508, which in the microphone stand shown is a pole, and a base 1510.

The support apparatus 1506 comprises a body member 1512 having a first end portion 1514 and a second end portion 1516. The body member 1512 comprises a first set of support elements 1518 and a second set of support elements 1520.

The first set of support elements 1518 comprises twelve rigid support elements 1518*a* arranged in four central pairs and two end pairs. The support elements 1518*a* of each central pair are pivotally connected to each other at their respective centres to form a cross-linked arrangement. The ends of the support elements 1518*a* of each pair of the first set of support elements 1518 are also pivotally connected to respective ends of adjacent pairs of support elements 1518*a* of the first set of support elements 1518, with the exception of the end pairs of support elements 1518*a* which are connected at one end to respective ends of the adjacent pair of support elements 1518*a*, and at the other ends to each other. The support elements 1518*a* of each of the end pairs of the first set of support elements are substantially half the length of the other support elements 1518a and so are arranged to form what is effectively half of a central pair of cross-linked elements. The arrangement has the advantage that the ends of the support elements 1518a at the ends of the body member 1512 do not move laterally as the body member 1512 is extended and contracted.

The second set of support elements 1520 has an arrangement which is similar to the arrangement of the first set of support elements 1518. However, the second set of support elements 1520 comprises twenty rigid support elements 1520a arranged in ten pairs, in which the support elements 1520a of each pair are pivotally connected to each other at their respective centres to form a cross-linked arrangement. The support elements 1520a of the second set of support elements 1520 are approximately half the length of the cross-linked support elements 1518a of the first set of support elements 1518. The smaller length and greater number of support elements 1520a of the second set of support elements 1520 makes the second set of support elements 1520 more compact in the lateral direction (i.e. narrower) than the first set of support elements 1518, but allows the second set of support elements 1520 to extend to a maximum length which is substantially the same as the maximum length to with the first set of support elements 1518 can be extended.

The second set of support elements 1520 further comprises first and second end elements 1521a, 1521b. Each end element 1521a, 1521b is pivotally connected at one end to the free end of a support element 1520a of an end pair of support elements 1520a, and slidably connected to the other support element 1520a of the respective end pair of support elements 1520a to allow for expansion and contraction of second set of support elements 1520.

The second set of support elements 1520 is pivotally connected to the first set of support elements 1518 at each cross-link connection of each pair of the first set of support elements 1518 and each cross-link of every other (i.e. alternate) pair the second set of support elements 1520. The second set of support elements 1520 are arranged to rotate with respect to the first set of support elements 1518 about a rotational axis which is substantially parallel with the longitudinal direction of the body member 1512. The arrangement provides improved rigidity and resistance to flexing and twisting, but allows the support apparatus 1506 to be folded making it compact for easy transportation and/or storage.

The first set of support elements 1518 and the second set of support elements 1520 form an extendable and contractable arrangement which allows the body member 1512 to be extended and contracted in a longitudinal direction of the body member 1512. The arrangement is comparable to the extendable arrangement associated with the device commonly referred to as 'lazy tongs'.

The body member 1512 further comprises five elongate support members 1524 that are secured to the first set of support elements 1518. Each support member 1524 has a fixed length which is substantially equal to the width of the body first set of support elements 1518 when in a contracted configuration. Each support member 1524 is pivotally connected to at least one of the end of a support element 1518a of a pair of cross-linked support elements and slidably connected to at least one end of the other of the cross-linked support elements 1518a. In the embodiment shown, each support member 1524 is connected at the pivotal connection between support elements 1518a of adjacent pairs of support elements 1518a using the same fasteners (e.g. a bolt) that connects the support elements 1518a. The fixed length of each support member 1524 means that, as the body member 1512 is extended, and the span of the cross-linked support elements 1518a of the first set of support elements 1518 narrows in a lateral direction (and the fastener that is slidably connected to each support member 1524 slides with respect to the support member 1524 to which it is connected), the support members 1524 maintain a consistent span for supporting devices.

Figure 29:
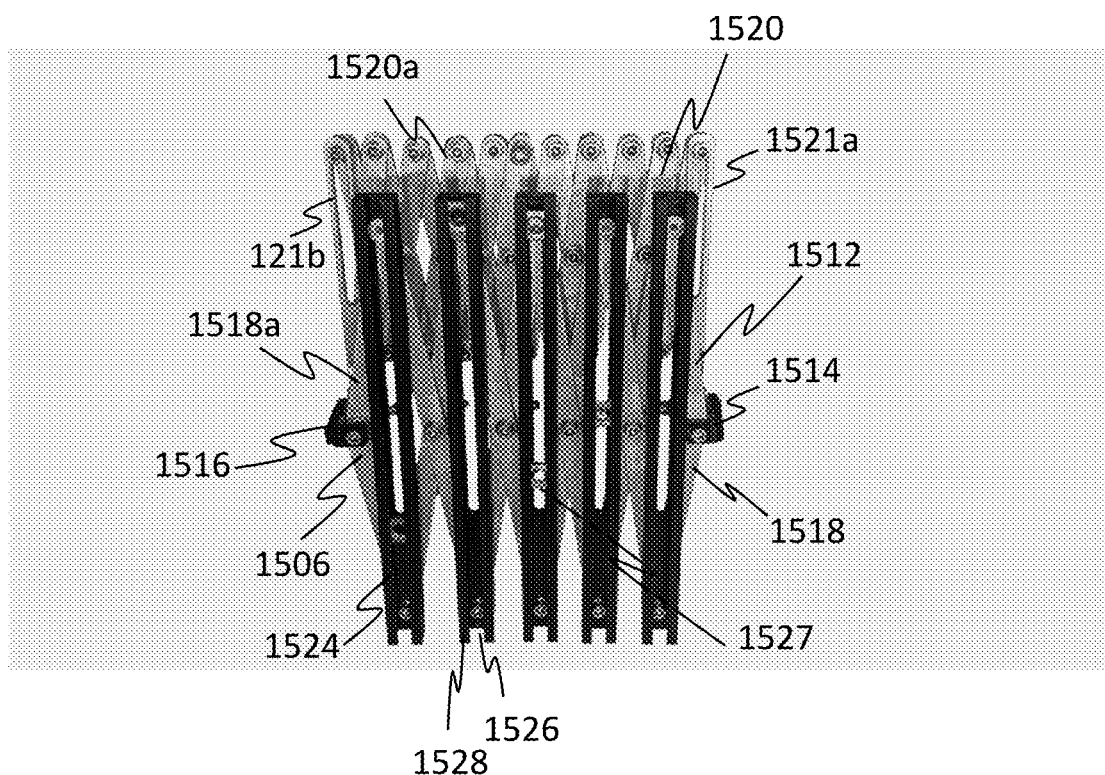
FIG. 29 shows the support apparatus shown in FIG. 1.

Each support member 1524 comprises a rigid metal bar having a channel 1526 that extends along its length. The channel 1526 is open-ended and configured to receive a nut 1527 (see FIG. 29) through each open end such that the nut 1527 can slide along the length of the channel 1526. It will be appreciated that only one end of the channel 1526 need be open to receive a nut.

The channel 1526 is closed at the bottom along its length and opens upwardly such that a threaded portion of a bolt or other similar attachment feature of a performance device (not shown) can be inserted into the channel 1526 and threaded into a nut 1527 disposed therein. Overhanging portions 1528 extend along each side of the channel 1526, respectively. The overhanging portions 1528 form retaining features which hold a nut 1527 captive within the channel 1526. Each channel 1526 is thus configured to hold a nut 1527 captive within the channel 1526 and to allow the nut 1527 to slide along the channel 1526. Each channel 1526 together with the overhanging portions 1528 provide a fixing feature to which a device may be secured to the support member 1524. End caps may be provided on the ends of each support member 1524 to hold nuts 1527 within each channel when not in use. It will be appreciated that alternative features to the overhanging portions may be provided for holding a nut captive within each channel 1526. Alternative, or additional fixing features, such as at least one aperture (see aperture 1530 in FIG. 30) or a plurality of apertures spaced along each support member 124 may be provided. In further embodiments a fixing feature in the form of a slot, similar to slots found in conventional stereo bars, may be provided.

A connecting element in the form of a first clamping arrangement 1522 is secured to the distal pivotal connection between the central pairs of the second set of support elements 1520. The first clamping arrangement 1522 clamps to the upright portion 1508 of the microphone stand 1504. A further connecting element in the form of a second clamping arrangement may be secured to the central support member, if required.

Once assembled, the assembly 1502 can be used to support various devices, and particularly various types of performance devices for different purposes.

It will be appreciated that the body member may comprise multiple support members, but not all may be provided with a fixing feature. For example, some support members may be configured to provide support without fixation, such as for supporting a keyboard.

Figure 28:
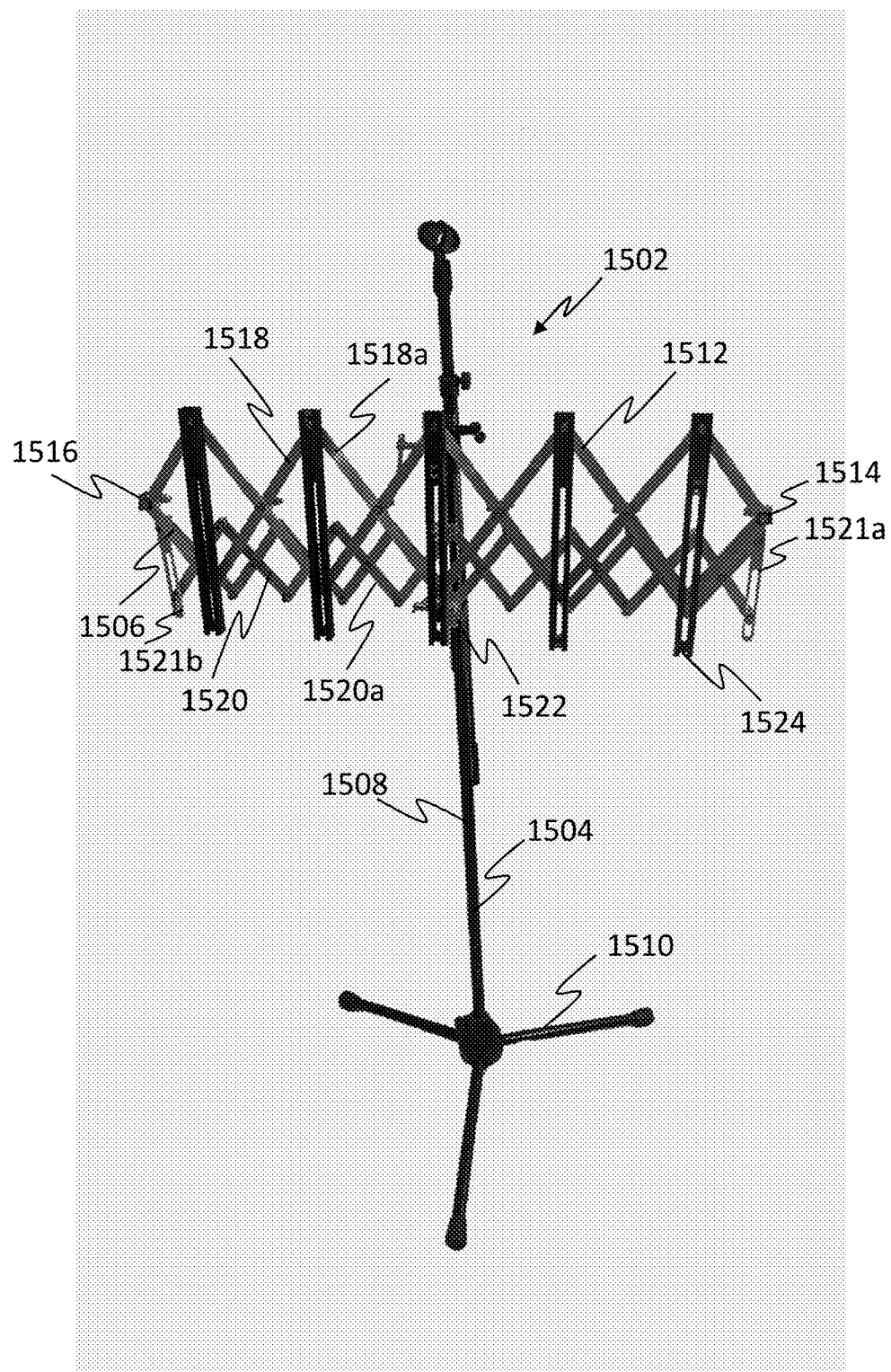
FIG. 28 shows the assembly shown in FIG. 1 in a second configuration.

The configuration shown in FIG. 27 is particularly suitable for supporting a keyboard. However, the support apparatus 1506 may be arranged such that the support members 1524 extend vertically by rotating the first set of support elements 1518 with respect to the second set of support elements 1520 into a vertical orientation, as shown in FIG. 28. This may be particularly suitable for supporting microphones and/or as a stand for instruments, such as guitars.

For example, a device such as a microphone mount having a standard threaded portion, such as a ⅝ inch female connector having 27 threads per inch or a ⅜ inch female connector having 16 threads per inch (which are typical industry standards), may be secured to one of the support members 124 by first connecting a corresponding male thread-to-male thread adapter to the microphone mount (the adapter and the microphone mount may then be considered to be the 'device'), and then inserting the exposed threaded portion of the adapter in the opening in the channel 1526 so as to engage a nut 1527 held therein. The adapter is then thread into the nut 1527 with the microphone mount attached (e.g. by rotating the microphone mount) so as to clamp the overhanging portions between the nut 1527 and an abutment feature of the adapter or the microphone mount (e.g. a collar). Features of the nut 1527, such as flat surfaces, abut the inner side walls of the channel 1526 and so prevent the nut 1527 from rotating within the channel 1526 as the microphone mount is secured. The microphone mount can therefore be secured and removed from a support member 1524 without having to have access to the nut 1527. The microphone mount is thus secured firmly to the support member 1524 at any desired position along the support member 1524. In particular, the microphone mount is not restricted to a finite number of discrete mounting positions, but can be secured at any position along the continuous length (i.e. an infinite number of locations) of the portion of the support member 1524 along which the channel 1526 extends.

Figure 30:
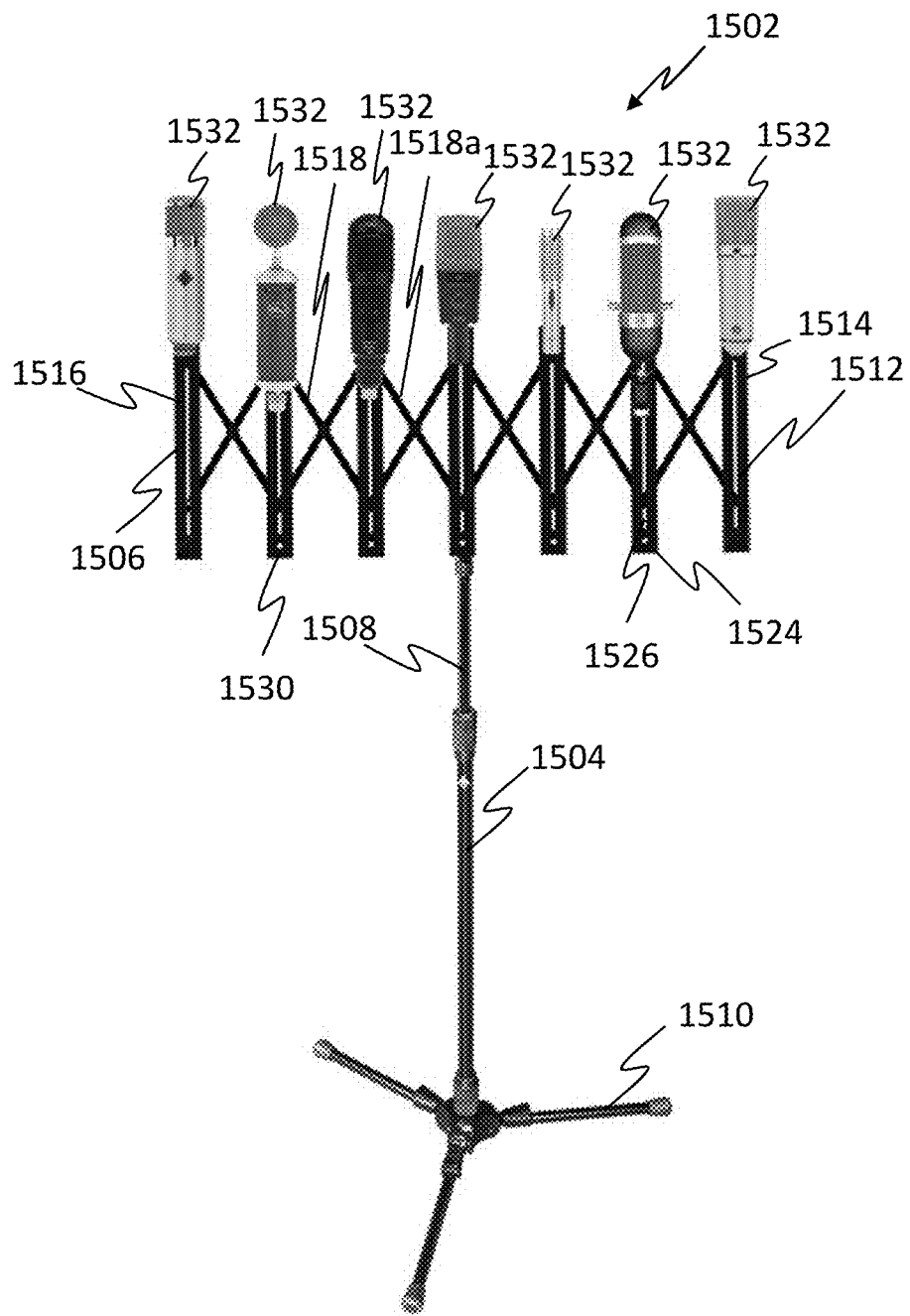
FIG. 30 is a schematic representation of an assembly provided with a selection of devices.

For example, FIG. 30 is a schematic illustration of microphones/microphone mounts 132 secured to respective support members 1524. The microphones can be positioned at desired locations along each support member 1524 so that they are each set a desired distance from a static source of sound (e.g. a person or instrument) that is to be recorded. This allows for different types and sizes of microphones to be set up alongside each other in accordance with the individual requirements of each microphone.

Figure 31:
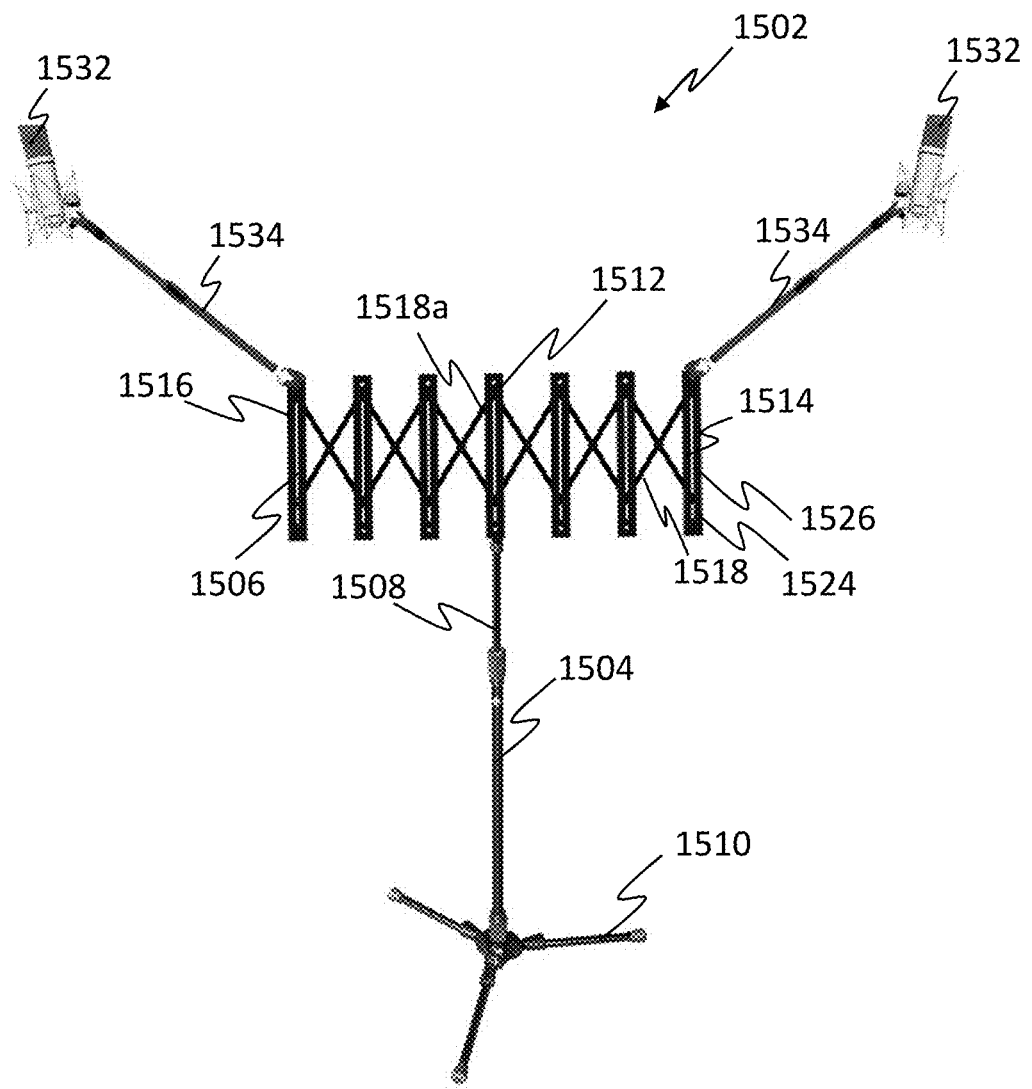
FIG. 31 is a schematic representation of an assembly provided with a further selection of devices.

FIG. 31 is a schematic illustration of an arrangement in which the support apparatus 1506 is used in conjunction with booms 1534 to provide support for microphones 1532 that are spaced apart to record from different sources using a single microphone stand.

Figure 32:
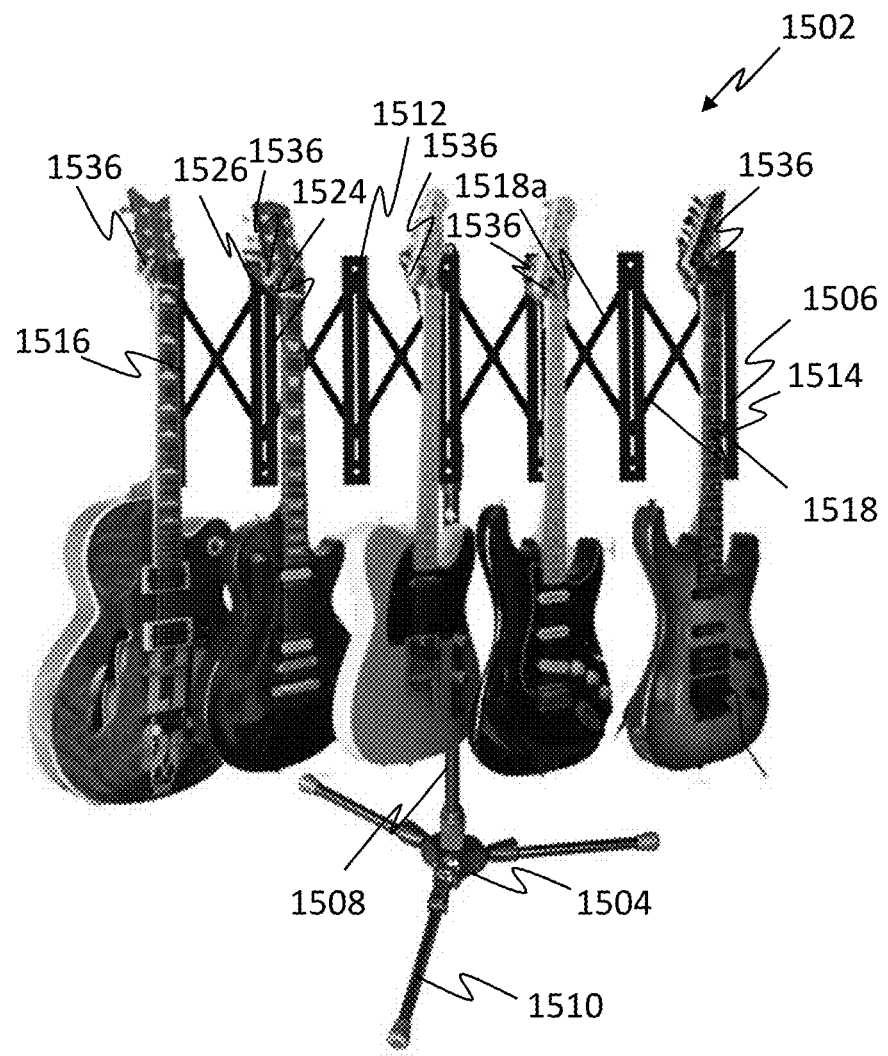
FIG. 32 is a schematic representation of an assembly provided with a selection of devices.

FIG. 32 is a schematic illustration of an arrangement in which the support apparatus 1506 is used in conjunction with guitar hangers 1536 secured to respective support members 1524 to support multiple guitars using a single microphone stand.

It will be appreciated that the support apparatus could be used to support various devices including one or more of a socket member configured to receive a spigot (such as a quick-release coupler), a microphone mount, a guitar hanger, a keyboard support, a lighting mount, a platform, a multi-component fitting, a clamping arrangement, a boom, a percussion instrument, a bracket, a speaker, a camera, an extender, an adaptor, an electronic display and a table holder having a fastening feature.

It will be appreciated that the support apparatus 1506 could be secured to other types of support structure, such as a wall, dedicated framework and still provide the benefits described above. The support apparatus 1506 may be provided with a connecting element, such as a spigot, at the first end portion 1514 and the second end portion 1516 for connection to respective coupling devices (such as respective quick-release couplers) provided on one or more support structures, such as coupling devices provided on respective microphone stands, that are configured to releasably receive each spigot.

When not in use, the support apparatus 1506 may be in a contracted configuration in which the body member 1512 is contracted. The contracted configuration is compact and allows for easy storage and transportation of the support apparatus 1506.

Once the support apparatus 1506 has been secured to the microphone stand 1504 the amount of extension of the body member 1512 can be adjusted. The amount of extension could, of course, be adjusted prior to attaching the support apparatus 1506 to the microphone stand 1504.

The support apparatus 1506 provides a convenient and compact means for supporting various performance devices. Since microphone stands are relatively numerous at venues and recording studios, the support apparatus 1506 provides a desirable alternative to dedicated supports for different types of devices.

It will be appreciated that in some circumstances other portions of a microphone stand could be used as attachment points, including portions which are or may be inclined to the vertical. Furthermore, the various clamping arrangement and body members described above with respect to the different embodiments of the apparatus may be used, where suitable, interchangeably to provide a desired configuration and/or functionality. Several apparatus may be connected to microphone stands such that they provide a modular arrangement which provides support for one or more devices.

Figure 33:
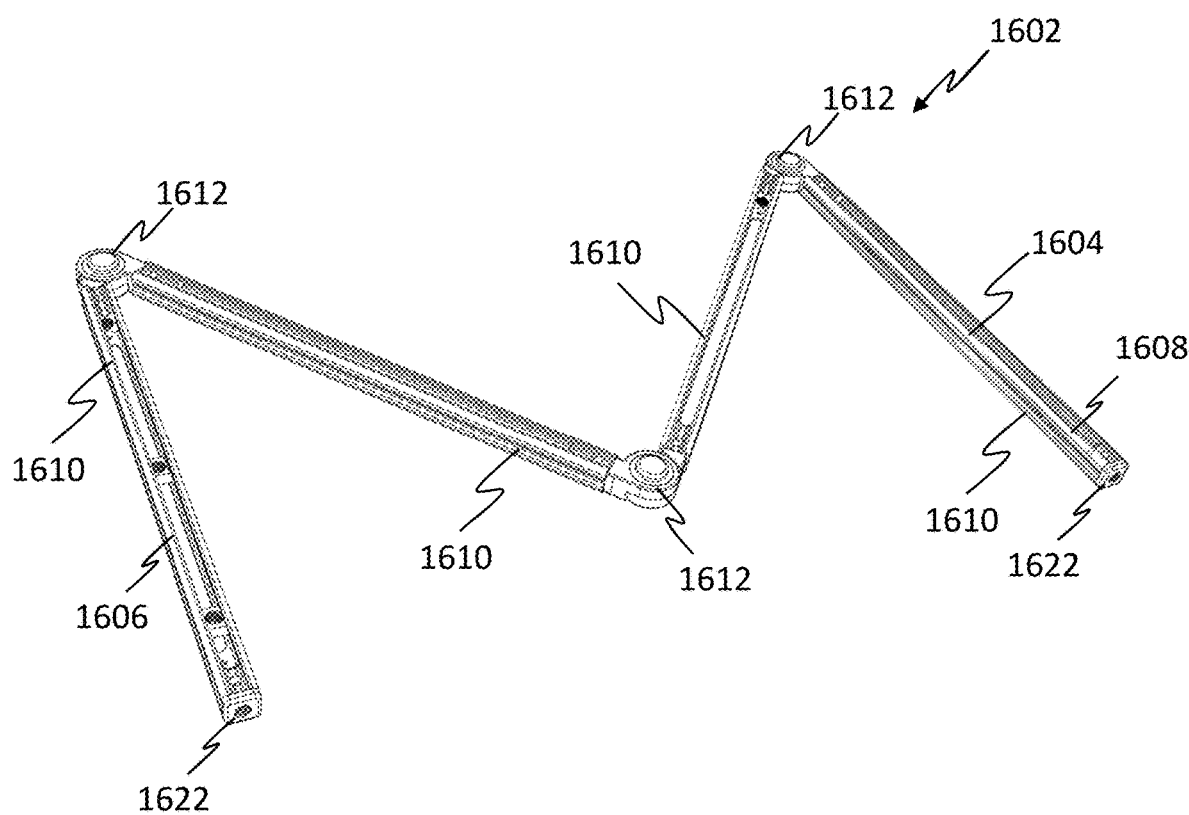
FIG. 33 shows a support apparatus with end caps.

FIG. 33 shows a support apparatus 1602 comprising a body member 1604 having a first end portion 1606 and a second end portion 1608.

The body member 1604 comprises a plurality of support elements 1610 which are pivotally connected to each other by detachable joints 1612 to form an extendable arrangement. The embodiment shown comprises four support elements 1610 and three detachable joints 1612. The detachable joints 1612 connect adjacent support elements 1610 together such that the support elements 1610 can pivot relative to each other.

Figure 35:
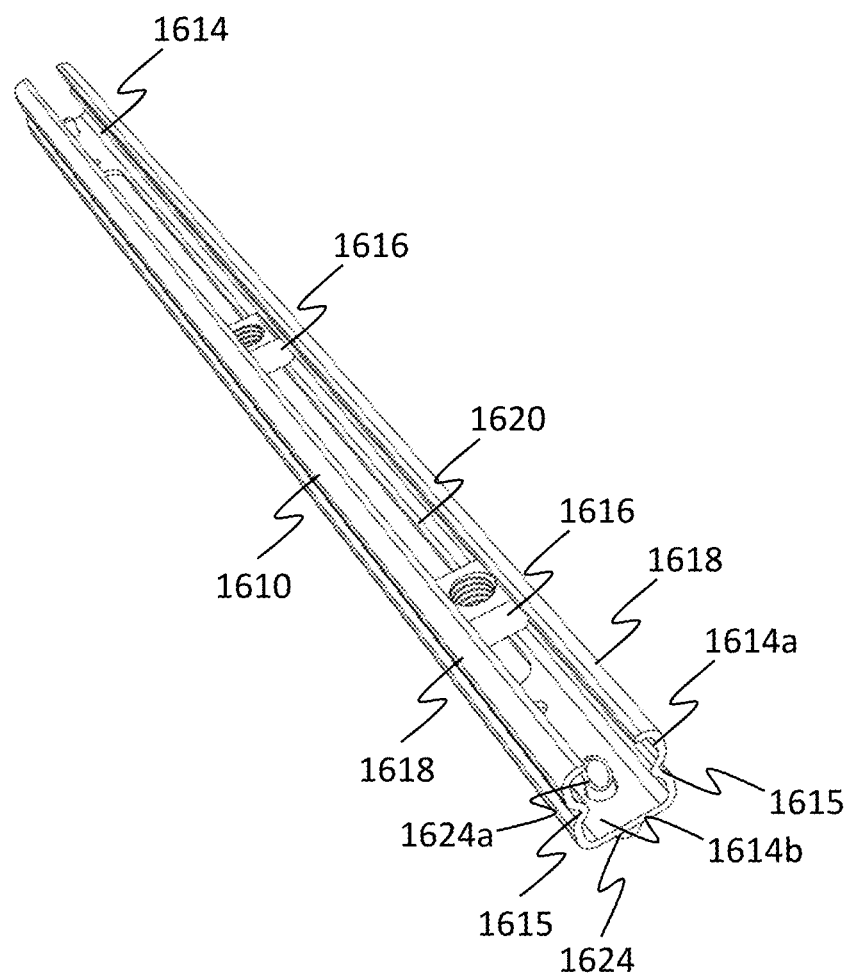
FIG. 35 shows a support element of the support apparatus shown in FIGS. 33 and 34.

With reference to FIG. 35, each support element 1610 is elongate and comprises a rigid metal bar having a channel 1614 that extends along its length. The channel 1614 is open-ended. Opposing rails 1615 extend along the length of the sides of the channel 1614. The rails 1615 define an upper region 1614a and a lower region 1614b of the channel 1614. The channel 1614 is configured to receive at least one nut 1616a in the upper region 1614a of the channel 1614 and at least one nut 1616b in the lower region 1614b of the channel 1614 through each open end such that the nuts 1616a, 1616b can slide along the rails 1615 and the bottom of the channel 1614, respectively. It will be appreciated that only one end of the channel 1614 need be open to receive a nut.

The channel 1614 is closed at the bottom along its length and opens upwardly such that a threaded portion of a bolt or other similar attachment feature of a performance device (not shown) can be inserted into the channel 1614 and threaded into a nut 1616a disposed in the upper region 1614a of the channel 1614. Overhanging portions 1618 extend along each side of the channel 1614, respectively. The overhanging portions 1618 form retaining features which hold a nut 1616a captive within the channel 1614. The channel 1614 is thus configured to hold a nut 1616a captive within the channel 1614 and to allow the nut 1616a to slide along the rails 1615 within the upper region 1614a of the channel 1614. The channel 1614 together with the overhanging portions 1618 provide a fixing feature to which a device, such as a microphone mount, guitar mount, camera mount or boom amongst other, may be secured to the support element 1610.

A slot 1620 is provided along a portion of the support element 1616 forming the bottom of the channel 1614. The slot 1620 is configured to receive a connector, such as a threaded male connector, from below which may be secured to a nut 1616*b* disposed within the lower region 1614*b* of the channel 1614. The rails 1615 and the portion of the support element 1616 forming the bottom of the channel 1614 thus hold the nut 1616*b* captive within the lower region 1614*b* of the channel 1614 and allow the nut 1616*b* to slide along the bottom of the channel 1614 within the lower region 1614*b* of the channel 1614.

Figure 39:
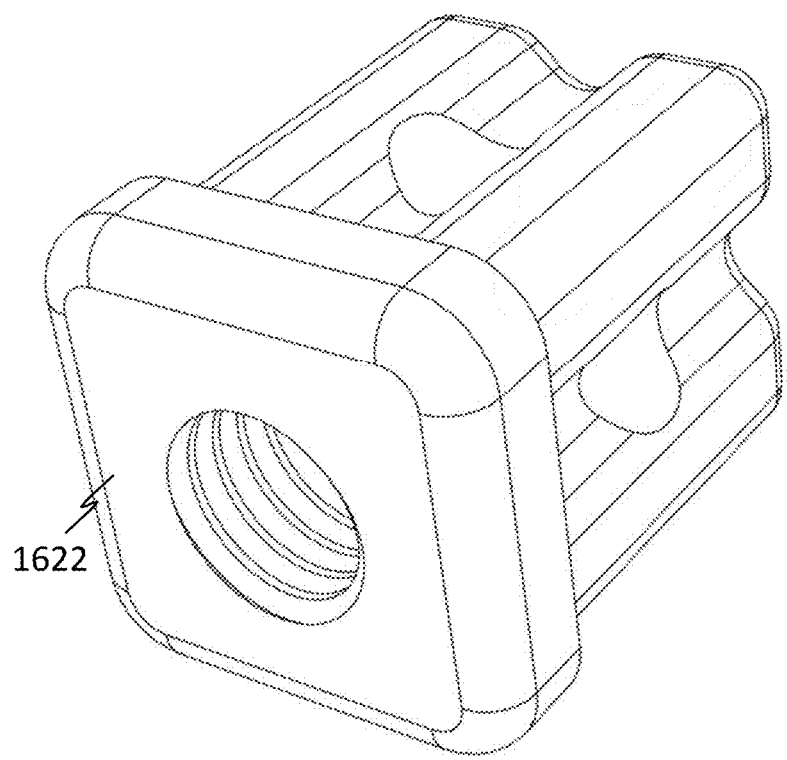
FIG. 39 shows an end cap.
Figure 40:
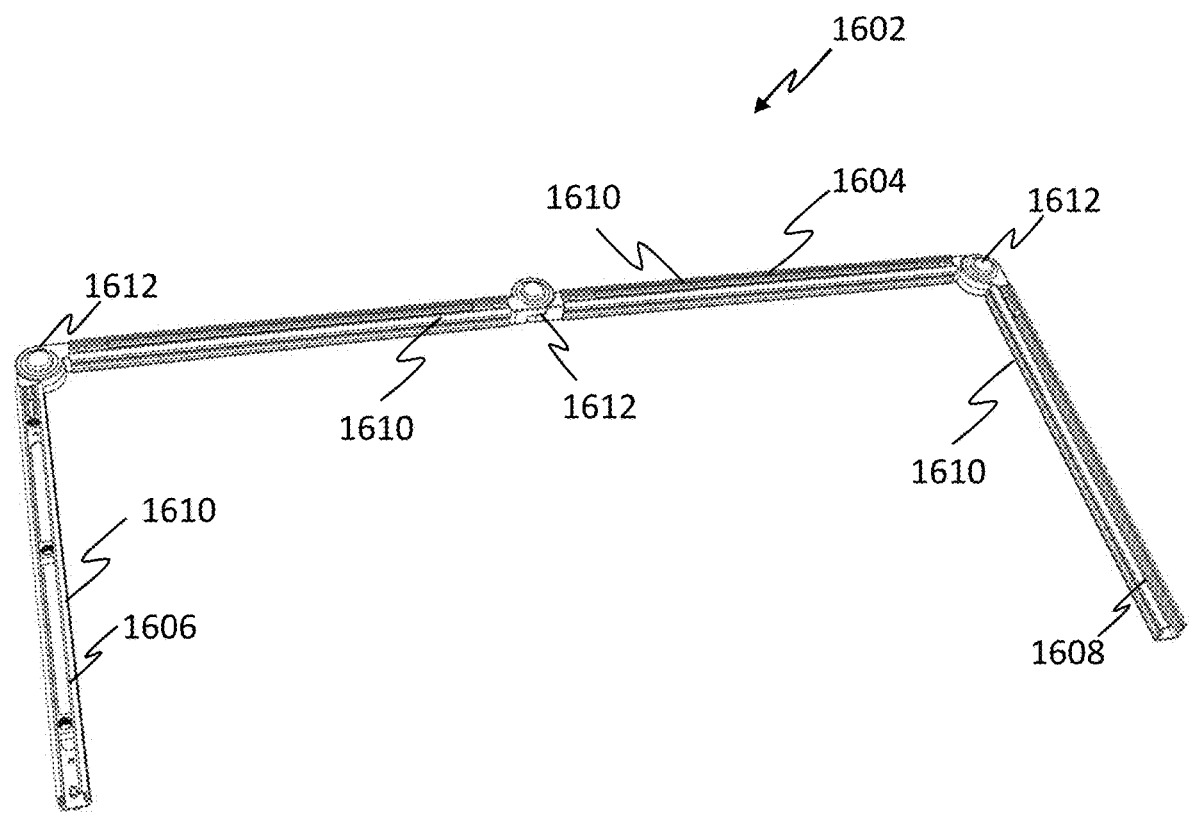
FIG. 40 shows the support apparatus shown in FIGS. 33 and 34 in an extended configuration and without end caps.

End caps 1622, such as the end cap 1622 shown in FIG. 33 and FIG. 39, may be provided on the unjoined ends of the support elements 1610 to hold nuts 1616*a*, 1616*b* within the channel 1614 when not in use. In the embodiment shown, each end cap 1622 is configured to receive a thread portion of a connector. It will be appreciated that alternative features may be provided for holding a nut captive within each channel 1614. Alternative, or additional fixing features, such as at least one aperture or a plurality of apertures spaced along each support element 1610 may be provided.

A latching element 1624 is provided at each end of the support element 1610. The latching element 1624 can be actuated between a latched configuration in which a latching portion 1624*a* of the latching element 1624 extends through a wall of the channel 1614 into the channel 1614 and an unlatched configuration in which it does not. The latching element 1624 is resilient and configured such that it is biased into the latched configuration. In the embodiment shown, the latching element is a resilient cantilevered beam secured to the rigid metal bar at one end and having the latching portion 1624*a* at the other end. Alternative forms of latching elements may be used.

Figure 36:
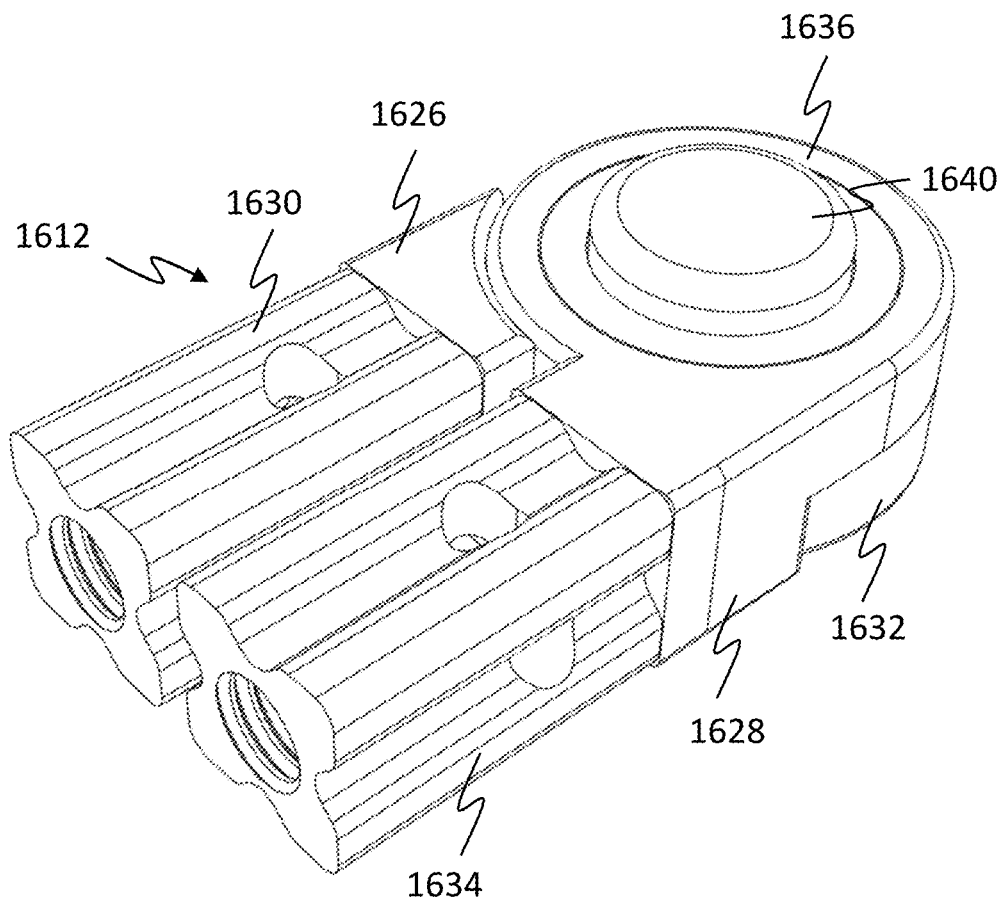
FIG. 36 shows an hinge connector of the support apparatus shown in FIGS. 33 and 34.
Figure 37:
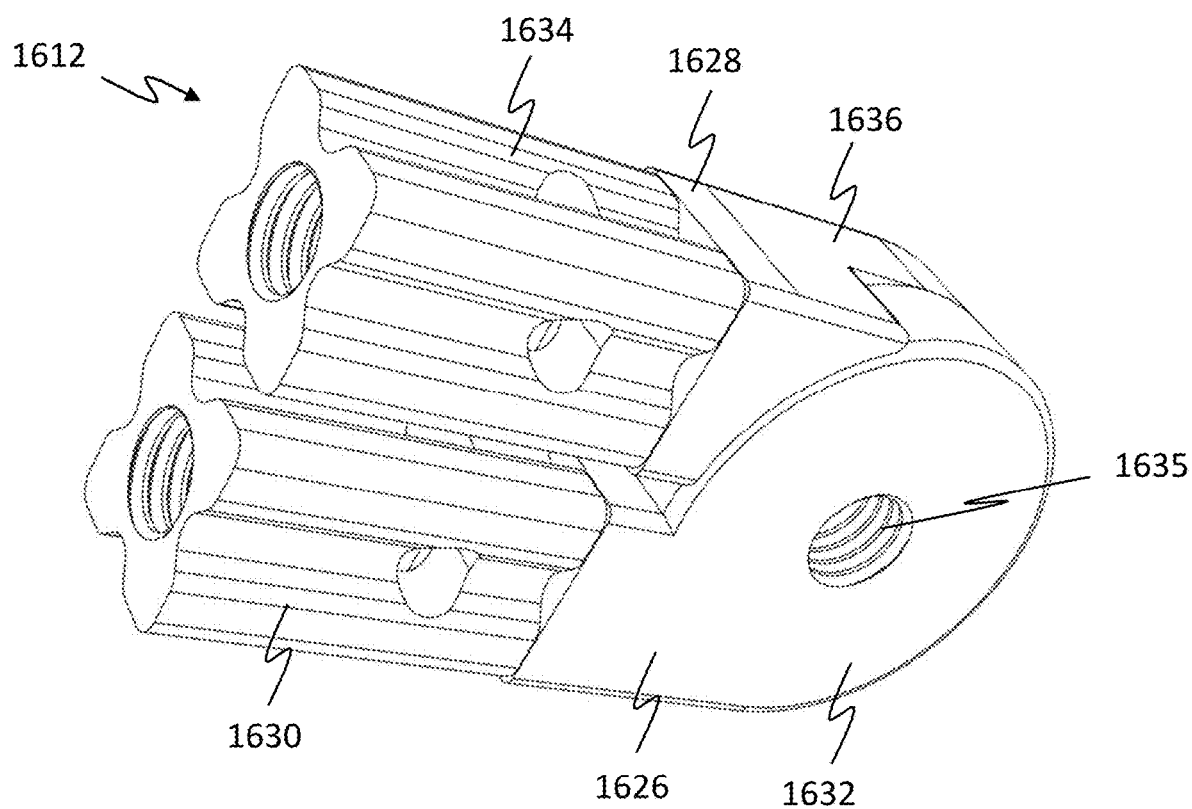
FIG. 37 shows the hinge connector shown in FIG. 36 from a different perspective.
Figure 38:
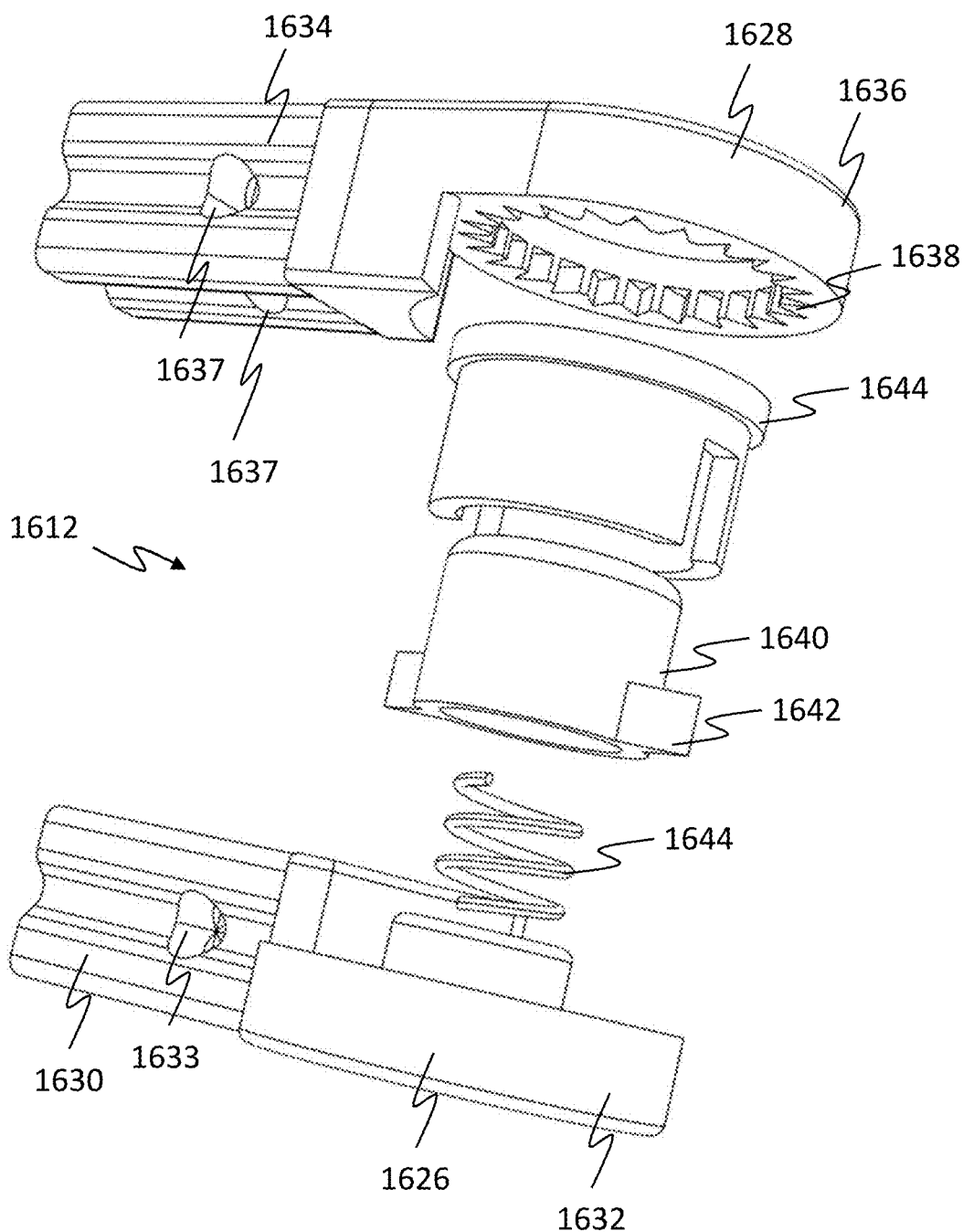
FIG. 38 is an exploded view of the hinge connector shown in FIGS. 36 and 37.

With reference to FIGS. 36 to 38, each detachable multi-angle joints 1612 comprises a first joint member 1626 and a second joint member 1628 arranged to rotate with respect to each other.

The first joint member 1626 has a first arm portion 1630 which is configured to be inserted into the end of a channel of 1614 of a support element 1610 and a first rotor portion 1632. The first arm portion 1630 has apertures 1633, arranged to extend perpendicular to the longitudinal direction of the first arm portion 1630 and each other. The apertures 1633 are configured to receive the latching portion 1624*a* of the latching element 1624 when the first arm portion 1630 is inserted into a support element 1610. The first arm portion 1630 may be inserted in a selected one of four different orientations in accordance with preference to allow rotation of adjacent support elements 1610 in different planes with respect to each other. The first rotor portion 1632 is provided with opposing locking recesses (not visible) for receiving locking teeth of a locking member. The first rotor portion 1632 has an attachment feature 1635 in the form of a threaded bore configured to receive a threaded bolt, such as a ⅝ inch male connector having 27 threads per inch or a ⅜ inch male connector having 16 threads per inch. The bore extends coaxially with a rotational axis of the first joint member 1626.

The second joint member 1628 has a second arm portion 1634 which is configured to be inserted into the end of a channel of 1614 of a support element 1610 and a second rotor portion 1636. The second arm portion 1634 has apertures 1637 arranged to extend perpendicular to the longitudinal direction of the second arm portion 1634 and each other. The apertures 1637 are configured to receive the latching portion 1624*a* of the latching element 1624 when the second arm portion 1634 is inserted into a support element 1610. The second arm portion 1634 may be inserted in a selected one of four different orientations in accordance with preference to allow rotation of adjacent support elements 1610 in different planes with respect to each other. The second rotor portion 1636 is provided with an internal gear arrangement having individual teeth 1638. In the present embodiment there are 24 teeth, but fewer or more teeth may be provided depending on the number of locking positions required.

A locking member 1640 is disposed between the first rotor portion 1632 and the second rotor portion 1636. The locking member 1640 has two locking teeth 1642 which are configured to selectively engage with the teeth 1638 of the second rotor portion 1636 and the locking recesses of the first rotor portion 1632. The locking member 1640 is movable between a locked configuration in which the locking teeth 1642 engage teeth 1638 of the second rotor portion 1636 and the locking recesses of the first rotor portion 1632 simultaneously, and an unlocked configuration in which the locking teeth 1642 are disengaged from the teeth 1638 of the second rotor portion 1636. The locking member 1640 is biased into the locked configuration by a spring 1644 (or other biasing member) disposed between the locking member 1640 and the first rotor portion 1632. An upper surface of the locking member 1640 is arranged to be pressed by a user by pushing a thumb or finger through an aperture defined by the gear arrangement of the second rotor portion 1636 in order to move the locking member 1640 into the unlocked configuration.

A guide member 1644 is disposed between the first rotor portion 1632 and the second rotor portion 1636 and surrounds the locking member 1640. The guide member 1644 has slots 1646 which engage with the locking teeth 1642 respectively, and guide the locking teeth 1642 along the slots.

The support apparatus 1602 is assembled by inserting the first arm portion 1630 of a first joint member 1626 into the end of a first support element 1610 and the second arm portion 1634 into a second support element 1610, such that the joint member 1626 is secured to the support elements 1610 by the respective latching elements 1624 of the support elements 1610. A second joint member 1626 is then secured into an unjoined end of one of the first or second support elements 1610 in the same manner, and then a third support element is secured to the second joint member 1626. This process is repeated until a support apparatus 1602 having a desired number of support elements 1610 is provided. The support apparatus 1602 is therefore a modular arrangement that is assembled from two or more support elements 1610 and one or more detachable joints 1612. Typically, the support apparatus 1602, once assembled, will comprise three or more support elements 1610 and two or more detachable joints 1612 in the manner described. The support apparatus 1602 may be supplied as a kit of parts for assembly of a selected number of support elements 1610 and detachable joints 1612 prior to use.

The angle of each joint member 1626 (and hence the angle between the support elements 1610 joined by each respective joint member 1626) may be adjusted by pressing down on the locking member 1640 to move it into its unlocked configuration which allows the first joint member 1626 to be rotated with respect to the second joint member 1628 of each detachable joint 1612. Once a desired angle has been set, the locking member 1640 is released and returned by the spring 1644 to the locked configuration.

Figure 34:
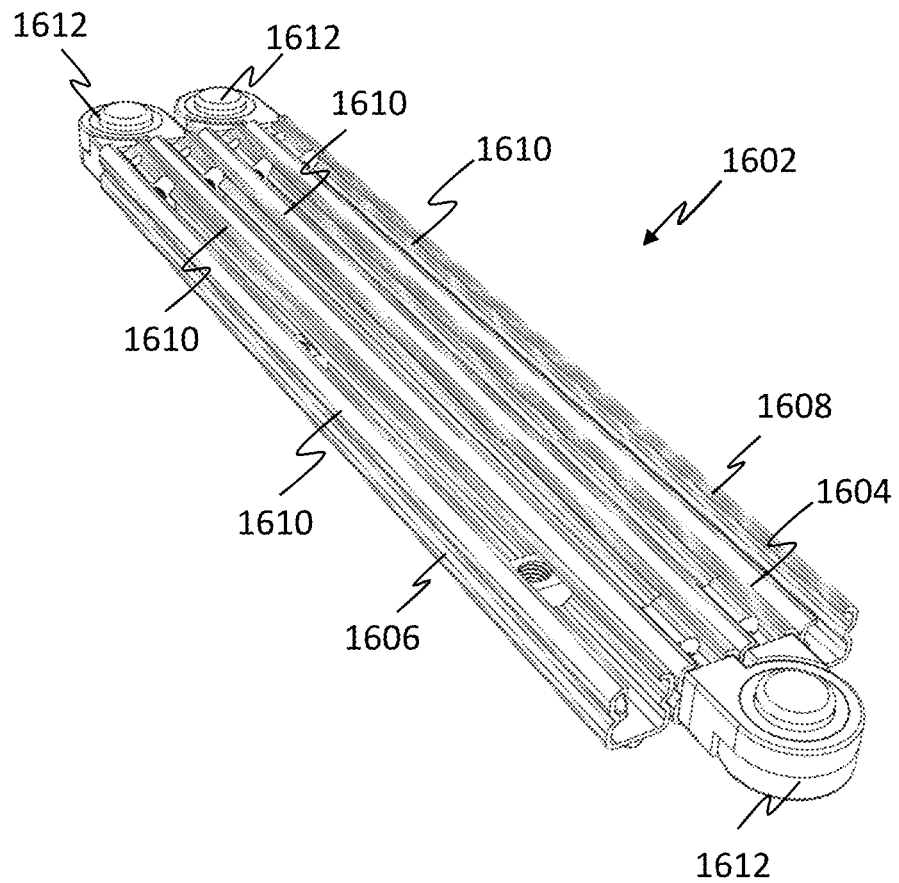
FIG. 34 shows the support apparatus in a contracted configuration and without end caps.

Once assembled, the body member 1604 of the support apparatus 1602 can be extended or contracted along a longitudinal direction of the body member 1604 (the longitudinal direction of the body member may be considered to be the direction in which the body member 1604 extends when in a fully-extended configuration) between a contracted configuration, as shown in FIG. 34, and a partially extended configuration or a fully extended configuration, and so the support apparatus 1602 may be arranged in a suitable configuration in accordance with requirements.

FIG. 33 shows a support apparatus 1602 that has been assembled in accordance with the above. End caps 1622 may optionally be inserted into the unjoined ends of the support elements 1610 forming the ends of the support apparatus 106, as shown in FIG. 33.

The support apparatus 1602 may be arrange in various extended configurations depending on requirements, such as those shown in FIG. 33, FIG. 40, FIG. 41 and FIG. 42. The support apparatus 1602 may be arranged in a contracted configuration for storage and/or transport, as shown in FIG. 34.

Figure 41:
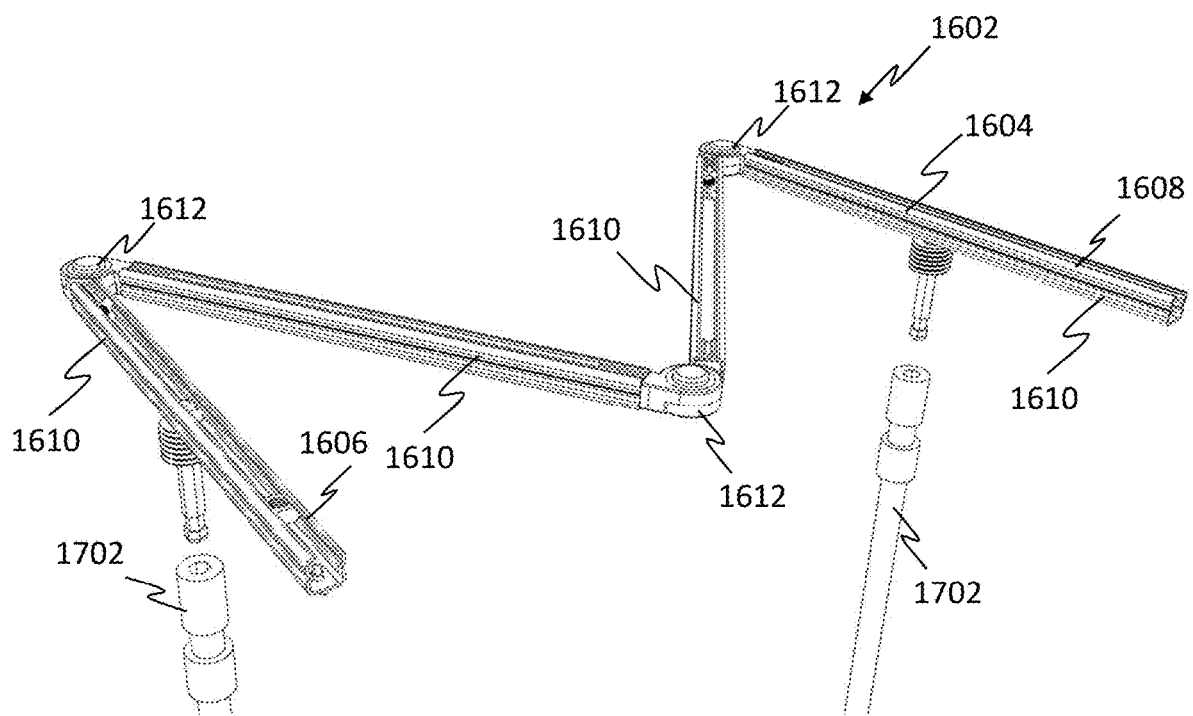
FIG. 41 show the support apparatus shown in FIGS. 33 and 34 without end caps in an extended configuration with spigot connectors.

The support apparatus 1602 is secured to one or more stands 1702, such as one or more microphone stands, in a horizontal orientation by attaching a connector having a threaded portion and a spigot portion, to a nut 1616*b* in the lower region 1614*b* of the channel 1614 by inserting the threaded portion through the slot 1620 into the nut 1616*b*, and the spigot portion into a correspondingly shaped connector mounted to the stand 1702, as shown in FIG. 41.

Figure 42:
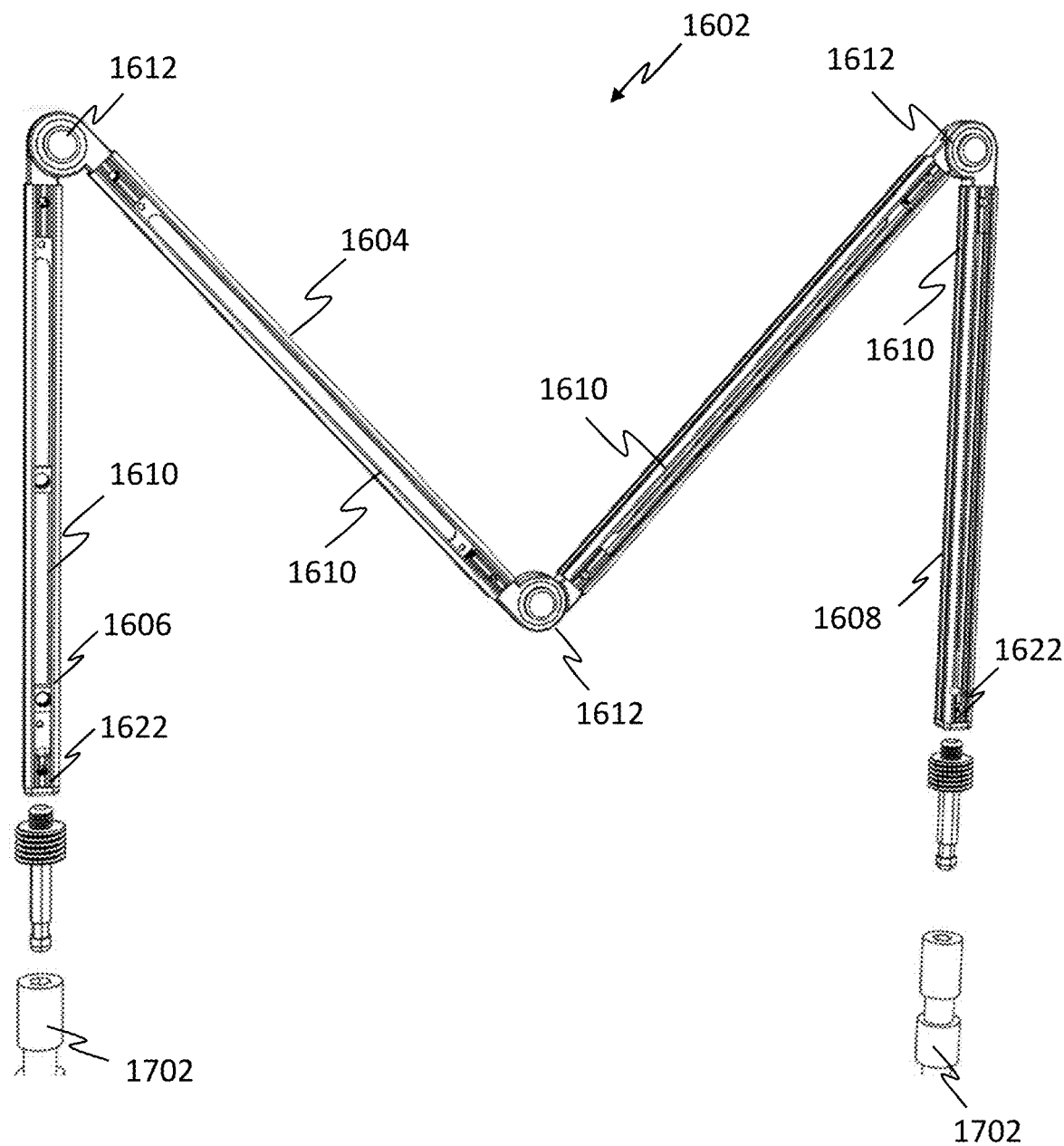
FIG. 42 show the support apparatus shown in FIGS. 33 and 34 with end caps in an extended configuration with spigot connectors.

Alternatively, the same connector shown in FIG. 41 could be inserted into end caps 1622 provided at the ends of the support apparatus 1602 in order to secure the support apparatus to microphone stands in a vertical orientation, as shown in FIG. 42.

Alternatively, the same connector shown in FIG. 41 could be inserted into the attachment feature 1635 in the first rotor portion 1632 of the detachable joints 1612 in order to secure the support apparatus to microphone stands in a horizontal orientation.

A device, such as a performance device comprising: at least one device selected from a socket member configured to receive a spigot, a connector comprising a spigot, a microphone mount, a guitar hanger, a keyboard support, a lighting mount, a platform, a multi-component fitting, a clamping arrangement, a boom, a percussion instrument, a bracket, a speaker, an extender, an adaptor, an electronic display and a table holder, may be secured to the support apparatus 1602 by inserting a threaded connector, which is coupled to the device, into upper opening of the channel and engaging the threaded connector with a nut 1616*a* provided in the upper region 1614*a* of the channel 1614, such that the nut 1614*a* and threaded connector clamp against the overhanging portions 1618.

In order to disassemble the support apparatus 1602, the latching elements 1624 are moved into the unlatched configuration to allow for an arm portion arm portion 1630, 1634 of a detachable joint 1612 to be withdrawn from the end of the support apparatus 1602 to which it is connected.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" or "comprising" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. Apparatus configured to support a musical keyboard between two microphone stands comprising:
   a body member having a first end portion and a second end portion, wherein the body member includes a plurality of support elements pivotally connected to one other by a plurality of detachable joints to form an extendable arrangement, each detachable joint including an arm portion configured to be inserted into an end of a channel of a support element, and each detachable joint including an unlocked configuration allowing pivotal movement between a pair of the support elements pivotally connected thereto and a locked configuration restricting pivotal movement between the pair of support elements pivotally connected thereto;

a first connecting element at the first end portion and configured to releasably secure to a first microphone stand; and a second connecting element at the second end portion and configured to releasably secure to a second microphone stand, wherein the body member is arranged with respect to the first connecting element and the second connecting element such that, when the first connecting element is secured to a first microphone stand and the second connecting element is secured to a second microphone stand which is spaced from the first microphone stand, the body member is arranged to support a musical keyboard for use of the keyboard.

2. The apparatus of claim 1, wherein the first and second connecting elements are configured to secure the body member to said first and second microphone stands such that the body member extends substantially horizontally.

3. The apparatus of any one of claim 1, where in the body member is extendable and has an extended configuration for supporting a musical keyboard and a contracted configuration.

4. The apparatus of claim 1, wherein each of the first and second connecting elements comprises a fastener for securing the respective first and second connecting elements to a microphone stand, wherein the fastener is a quick-release fastener.

5. The apparatus of claim 1, wherein the arm portion of each detachable joint is configured to be inserted into the end of the channel of each support element in a plurality of orientations.

6. The apparatus of claim 5, wherein the arm portion of each detachable joint is configured to be inserted into the end of the channel of each support element in at least four different orientations.

7. The apparatus of claim 1, wherein the channel of each support element is a U-channel.

8. The apparatus of claim 7, wherein each support element further includes an elongated slot extending along a bottom of the U-channel.

9. The apparatus of claim 7, wherein the first and second connecting elements each include a threaded portion, the apparatus further comprising first and second nuts configured to fit within respective channels of first and second support elements of the plurality of support elements and to respective receive the threaded portions of the first and second connecting elements.

10. The apparatus of claim 1, wherein each support member further comprises a plurality of apertures spaced along each support element and configured to receive a threaded portion of a connector.

11. The apparatus of claim 1, wherein each detachable joint includes a threaded bore configured to receive a threaded bolt.

12. The apparatus of claim 11, wherein the threaded bore of each detachable joint extends along a rotational axis of such detachable joint.

13. The apparatus of claim 1, further comprising a plurality of end caps configured to be received into ends of the plurality of support elements.

14. The apparatus of claim 13, wherein each end cap includes a threaded bore configured to receive a threaded bolt.

15. The apparatus of claim 1, wherein each of the first and second connecting elements comprises a connector with a threaded portion and a spigot portion.

16. The apparatus of claim 1, wherein the apparatus is further configurable to be secured to one of the first and second microphone stands in a horizontal orientation by securing a threaded portion of a connector to a support member of the plurality of support members using a nut received in a channel of such support member, and by inserting a spigot portion of the connector into a correspondingly shaped connector on the one of the first and second microphone stands.

17. The apparatus of claim 1, wherein the apparatus is further configurable to be secured to one of the first and second microphone stands in a vertical orientation by securing a threaded portion of a connector to an end cap disposed in an end of a support member of the plurality of support members, and by inserting a spigot portion of the connector into a correspondingly shaped connector on the one of the first and second microphone stands.

18. The apparatus of claim 1, wherein the apparatus is further configurable to be secured to one of the first and second microphone stands in a horizontal orientation by securing a threaded portion of a connector to an attachment feature of a detachable joint of the plurality of detachable joints, and by inserting a spigot portion of the connector into a correspondingly shaped connector on the one of the first and second microphone stands.

19. The apparatus of claim 1, further comprising a performance device comprising a socket member configured to receive a spigot, a connector comprising a spigot, a microphone mount, a guitar hanger, a keyboard support, a lighting mount, a platform, a multi-component fitting, a clamping arrangement, a boom, a percussion instrument, a bracket, a speaker, an extender, an adaptor, an electronic display or a table holder, wherein the performance device is secured to a support member of the plurality of support members by securing a threaded connector to such support member using a nut received in a channel of such support member.

20. The apparatus of claim 1, wherein the plurality of support members includes at least three support members and the plurality of detachable joints includes at least two detachable joints supplied as a kit of parts for assembly and disassembly, the plurality of support members are identically configured to one another, and the plurality of detachable joints are identically configured to one another, wherein the apparatus is configured to support the musical keyboard between the first and second microphone stands when assembled in a first configuration, and wherein the apparatus is further configured to support the musical keyboard using only the first microphone stand when assembled in a second configuration.

* * * * *